US009829028B2

(12) United States Patent
Changsrivong et al.

(10) Patent No.: US 9,829,028 B2
(45) Date of Patent: Nov. 28, 2017

(54) CONNECTORS WITH A PIN, A HOUSING, AND ONE OR MORE SPRINGS

(71) Applicant: BAL SEAL ENGINEERING, INC., Foothill Ranch, CA (US)

(72) Inventors: Derek Changsrivong, Foothill Ranch, CA (US); Rick Dawson, Foothill Ranch, CA (US); Jim Sittler, Foothill Ranch, CA (US)

(73) Assignee: Bal Seal Engineering, Inc., Foothill Ranch, CA (US)

( * ) Notice: Subject to any disclaimer, the term of this patent is extended or adjusted under 35 U.S.C. 154(b) by 542 days.

(21) Appl. No.: 14/080,688

(22) Filed: Nov. 14, 2013

(65) Prior Publication Data
US 2014/0130329 A1     May 15, 2014

Related U.S. Application Data

(60) Provisional application No. 61/726,920, filed on Nov. 15, 2012.

(51) Int. Cl.
*F16B 21/12*     (2006.01)
*F16B 21/07*     (2006.01)
*F16B 21/18*     (2006.01)

(52) U.S. Cl.
CPC .......... *F16B 21/125* (2013.01); *F16B 21/073* (2013.01); *F16B 21/186* (2013.01); *Y10T 29/49826* (2015.01); *Y10T 403/604* (2015.01)

(58) Field of Classification Search
CPC .... F16B 21/125; F16B 21/186; F16B 21/073; Y10T 403/604
See application file for complete search history.

(56) References Cited

U.S. PATENT DOCUMENTS

| 2,162,104 A | * | 6/1939 | Mosher | F16J 15/3276 15/220.4 |
| 2,168,818 A | * | 8/1939 | Condon | F16J 15/3212 277/553 |
| 3,174,500 A | | 3/1965 | Johnson et al. | |

(Continued)

FOREIGN PATENT DOCUMENTS

| DE | 685738 C | 12/1939 |
| DE | 1575099 A1 | 1/1970 |

(Continued)

OTHER PUBLICATIONS

Search Report from European Patent Office on related EP application (EP13193185.9) dated Mar. 16, 2015.

*Primary Examiner* — James Ference
(74) *Attorney, Agent, or Firm* — Klein, O'Neill & Singh, LLP

(57) ABSTRACT

The present application relates to connectors that use canted coil springs to retain a pin to a housing. The connectors have increased disconnect to connect force ratios. Dual concentric spring configuration allows for an initial locking configuration that can be overcome with higher force and deflection of the second spring. Dual springs in series in a constrained groove can require a high force for connector disconnect, since force vectors may be in a direction relatively close to being along the spring major axis. A curved groove wall can offer resistance to a spring that is required to slide first into the groove in order to allow disconnect.

29 Claims, 11 Drawing Sheets

(56) References Cited

U.S. PATENT DOCUMENTS

| | | | | |
|---|---|---|---|---|
| 4,647,230 A * | 3/1987 | Friedrich | ............. | F16C 19/185 384/486 |
| 4,655,462 A * | 4/1987 | Balsells | ............... | F16J 15/3212 267/1.5 |
| 4,678,210 A | 7/1987 | Balsells | | |
| 4,805,943 A * | 2/1989 | Balsells | ............... | F16B 21/078 267/167 |
| 4,872,710 A | 10/1989 | Konecny et al. | | |
| 4,907,788 A * | 3/1990 | Balsells | .................... | F16F 1/04 267/1.5 |
| 4,964,204 A * | 10/1990 | Balsells | ................. | F16F 1/045 29/896.9 |
| 5,052,782 A * | 10/1991 | Myer | .................... | G02B 7/026 359/694 |
| 5,082,390 A * | 1/1992 | Balsells | ................. | F16B 21/18 285/318 |
| 5,161,806 A * | 11/1992 | Balsells | ................. | F16J 15/027 267/1.5 |
| 5,411,348 A | 5/1995 | Balsells | | |
| 5,433,456 A * | 7/1995 | Nicholson | ............ | F16J 15/0893 277/644 |
| 5,503,375 A * | 4/1996 | Balsells | ................. | F16F 1/045 267/167 |
| 5,545,842 A | 8/1996 | Balsells | | |
| 5,791,657 A * | 8/1998 | Cain | ....................... | E21B 33/03 277/322 |
| 5,807,146 A * | 9/1998 | Baker | .................... | H01R 13/17 439/827 |
| 5,992,856 A * | 11/1999 | Balsells | ............... | F16J 15/3236 277/553 |
| 6,672,565 B2 | 1/2004 | Russell | | |
| 6,835,084 B2 | 12/2004 | Poon et al. | | |
| 6,918,595 B2 * | 7/2005 | Proper | ................... | F16J 15/104 277/436 |
| 7,055,812 B2 * | 6/2006 | Balsells | ................. | F16F 1/045 267/166 |
| 7,274,964 B2 * | 9/2007 | Balsells | ............... | A61N 1/3752 267/166 |
| 7,538,289 B2 | 5/2009 | Carroll | | |
| 7,640,841 B2 * | 1/2010 | An | ....................... | F16J 15/3212 277/553 |
| 7,722,415 B2 * | 5/2010 | Chansrivong | .......... | H01R 13/15 439/788 |
| 7,914,315 B2 | 3/2011 | Kuhn et al. | | |
| 7,914,351 B2 | 3/2011 | Balsells et al. | | |
| 7,999,202 B2 * | 8/2011 | Fujita | .................... | H01R 13/17 200/275 |
| 8,052,459 B2 | 11/2011 | Smith et al. | | |
| 8,096,842 B2 | 1/2012 | Poon et al. | | |
| 8,308,167 B2 | 11/2012 | Balsells et al. | | |
| 8,375,543 B1 * | 2/2013 | Balsells | ........................ | 267/167 |
| 8,382,532 B2 | 2/2013 | Sjostedt et al. | | |
| 8,491,346 B2 | 7/2013 | Sjostedt et al. | | |
| 8,544,850 B2 * | 10/2013 | Balsells | ................. | F16J 15/166 277/511 |
| 8,561,274 B2 | 10/2013 | Balsells | | |
| 9,004,805 B2 | 4/2015 | Changsrivong et al. | | |
| 9,267,526 B2 | 2/2016 | Balsells | | |
| 9,284,970 B2 | 3/2016 | Dilmaghanian et al. | | |
| 9,312,630 B2 | 4/2016 | Huang | | |
| 9,482,255 B2 | 11/2016 | Changsrivong et al. | | |
| 9,500,211 B2 | 11/2016 | Changsrivong | | |
| 9,534,625 B2 | 1/2017 | Balsells | | |
| 9,677,587 B2 | 6/2017 | Changsrivong et al. | | |
| 2002/0122690 A1 | 9/2002 | Poon et al. | | |
| 2003/0094812 A1 * | 5/2003 | Balsells | ................. | F16L 37/084 285/318 |
| 2003/0096526 A1 | 5/2003 | Balsells | | |
| 2004/0175229 A1 * | 9/2004 | Balsells | ................. | F16B 21/18 403/345 |
| 2005/0212218 A1 * | 9/2005 | Balsells | .................... | F16J 1/008 277/434 |
| 2006/0022414 A1 * | 2/2006 | Balsells | ............... | F16J 15/3268 277/572 |
| 2006/0083582 A1 * | 4/2006 | Balsells | ................. | F16B 21/18 403/325 |
| 2010/0029145 A1 * | 2/2010 | Balsells | ................. | H01R 13/03 439/827 |
| 2010/0064490 A1 * | 3/2010 | Balsells | ................. | F16B 19/02 24/711.1 |
| 2010/0090379 A1 * | 4/2010 | Balsells | ................. | F16B 21/18 267/1.5 |
| 2011/0006486 A1 * | 1/2011 | Niknezhad | ........... | F16J 15/3212 277/562 |
| 2011/0037234 A1 * | 2/2011 | Balsells | ............... | F16J 15/3212 277/562 |
| 2011/0062640 A1 * | 3/2011 | Leon | ........................ | B21F 1/00 267/166 |
| 2011/0280653 A1 * | 11/2011 | Sjostedt | ............... | H01R 13/187 403/361 |
| 2012/0034804 A1 * | 2/2012 | Smith | ................... | A61N 1/3752 439/345 |
| 2012/0134742 A1 * | 5/2012 | Changsrivong | ........... | A61F 2/78 403/328 |
| 2013/0149029 A1 * | 6/2013 | Changsrivong | ......... | F16B 17/00 403/361 |
| 2013/0149031 A1 * | 6/2013 | Changsrivong | ......... | F16B 17/00 403/376 |
| 2013/0288501 A1 * | 10/2013 | Russell | ................ | H01R 13/648 439/271 |
| 2014/0162487 A1 * | 6/2014 | Frederick | ............. | H01R 13/187 439/370 |

FOREIGN PATENT DOCUMENTS

| | | |
|---|---|---|
| DE | 19807663 | 9/1999 |
| EP | 2157340 A1 | 2/2010 |
| GB | 2194298 | 3/1988 |
| WO | WO 97/22830 A1 | 6/1997 |
| WO | WO 03067713 | 8/2003 |

\* cited by examiner

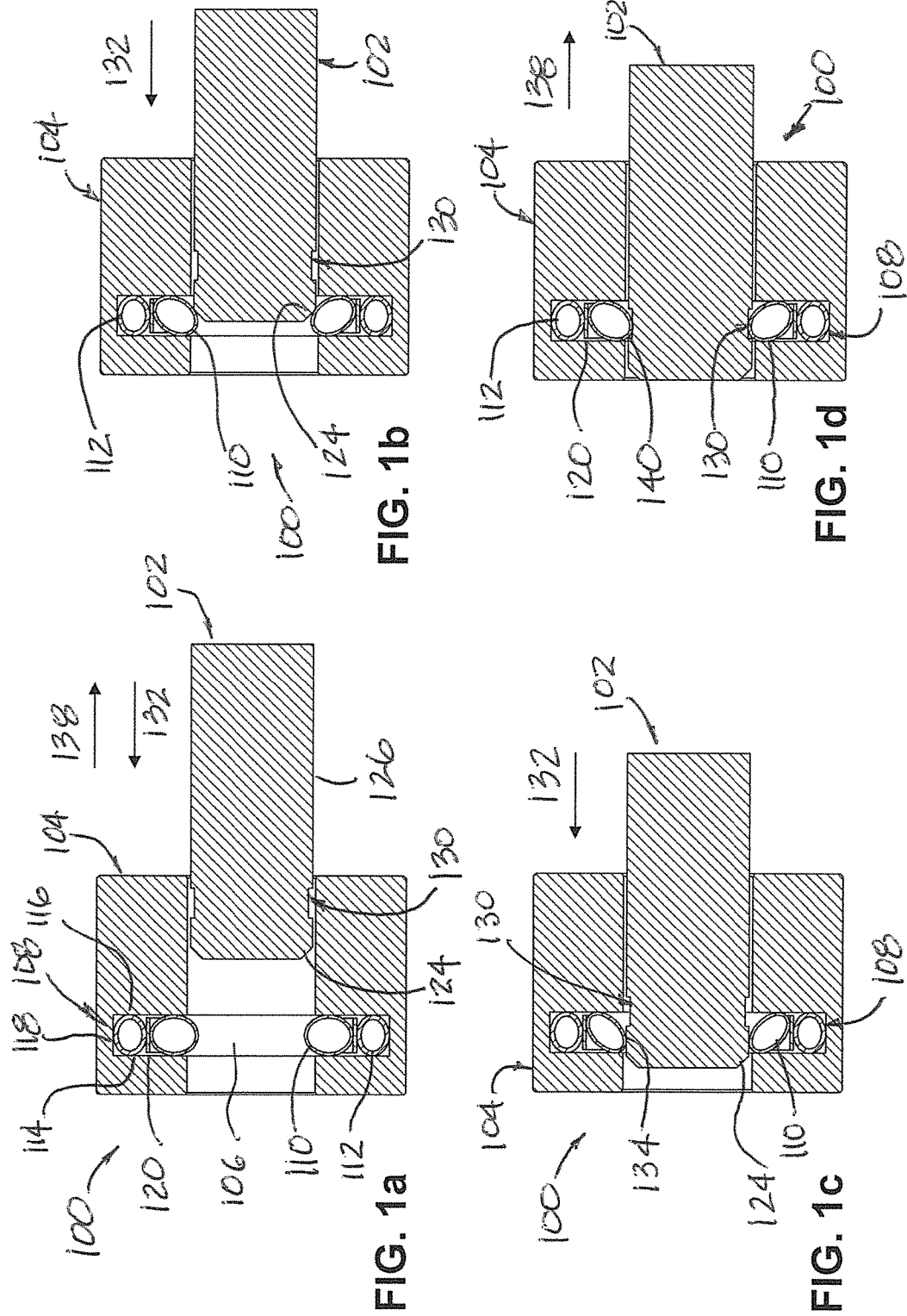

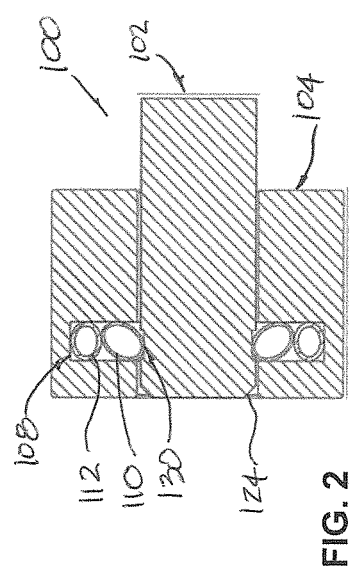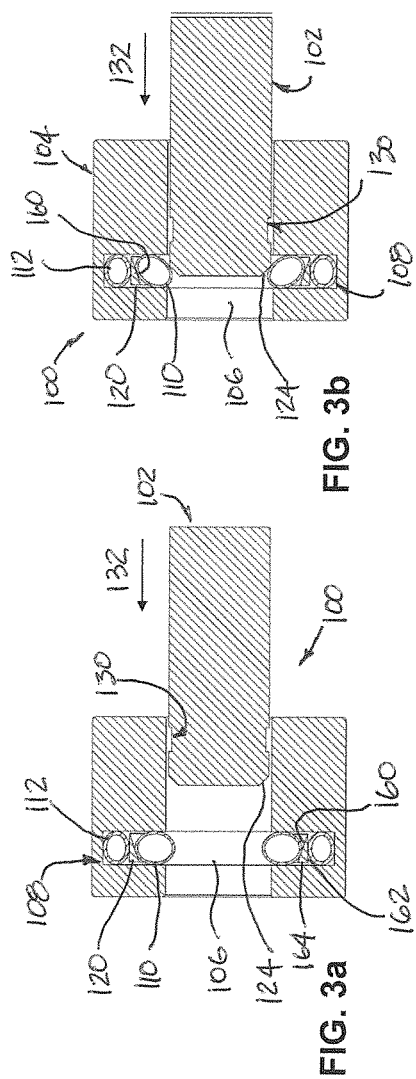

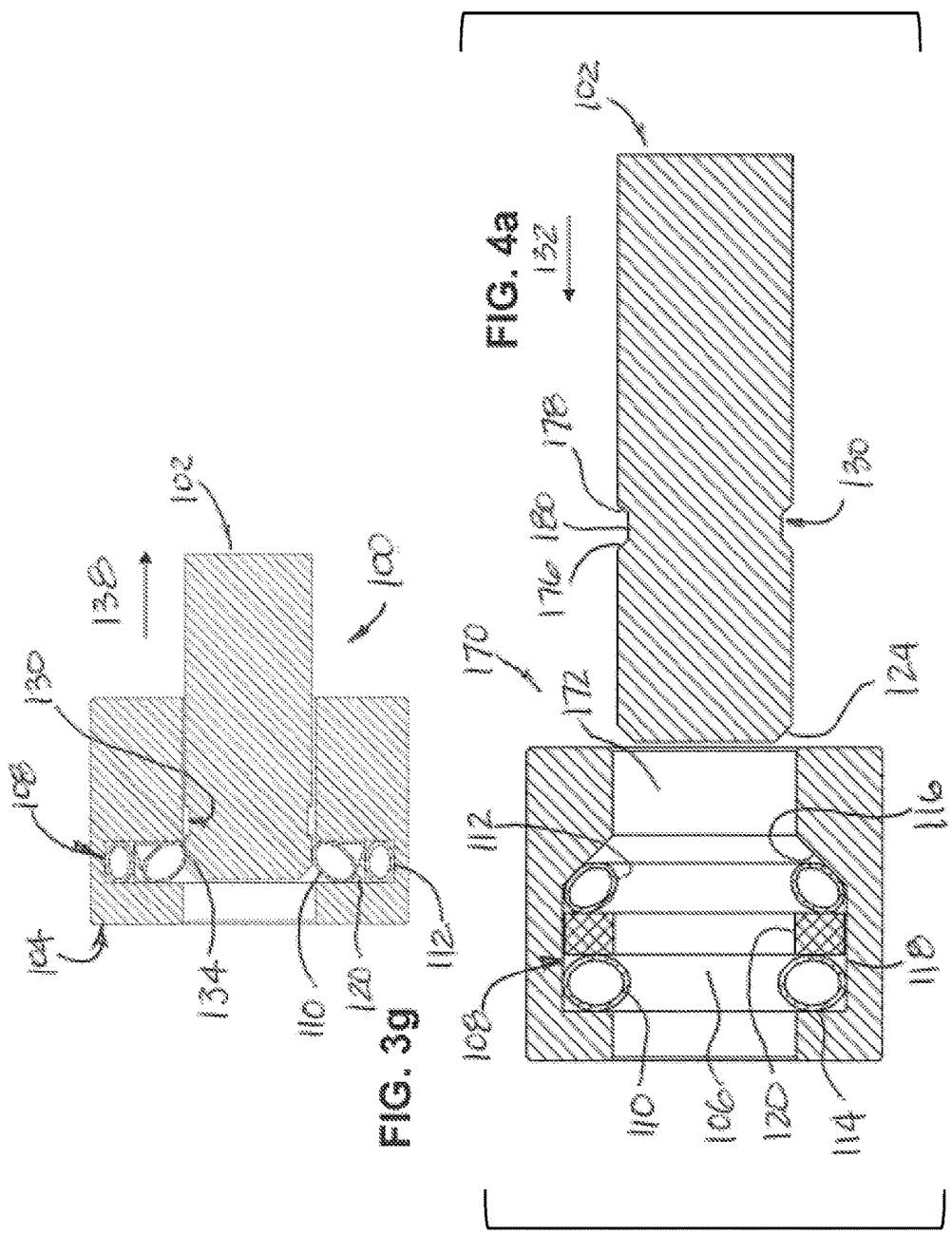

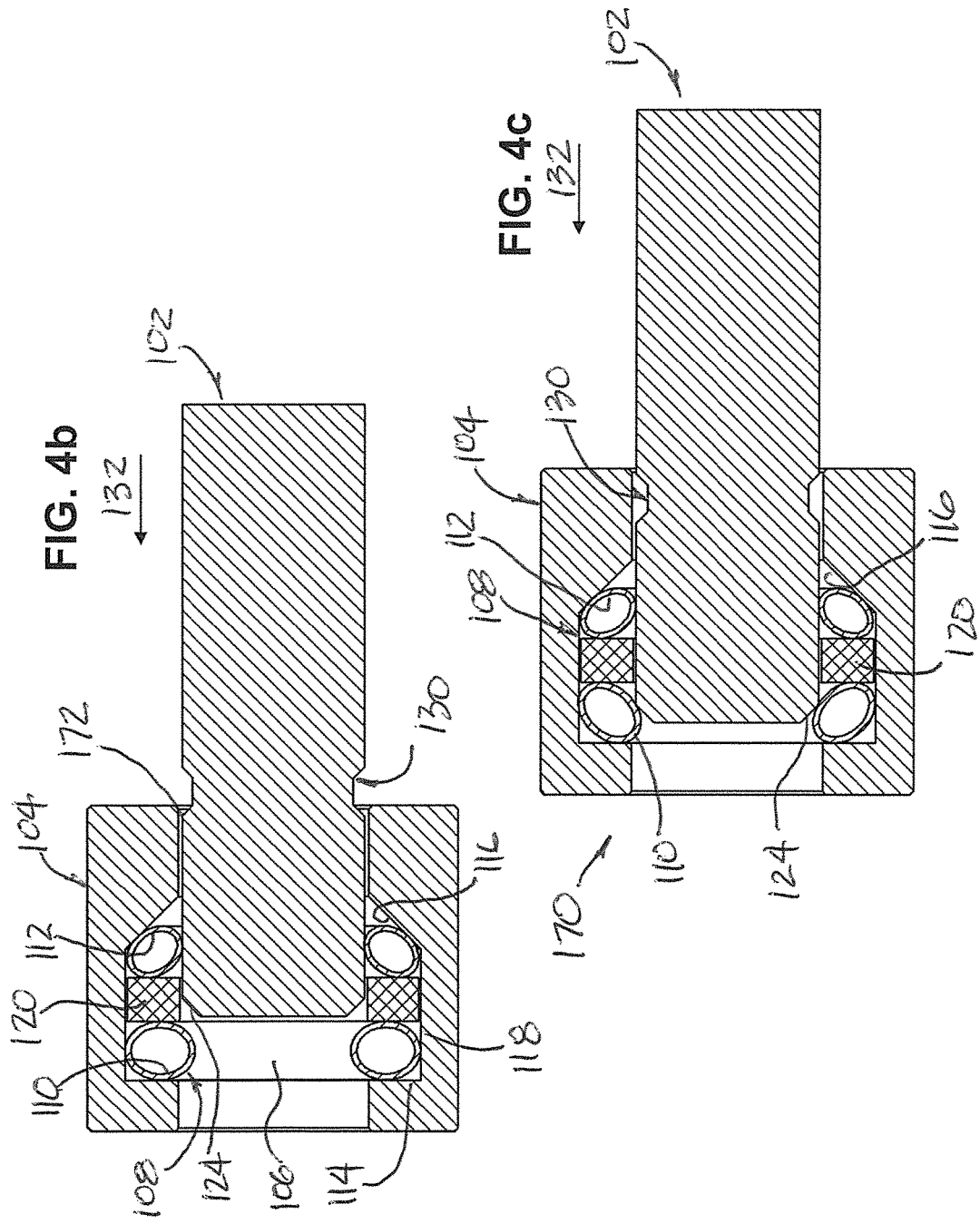

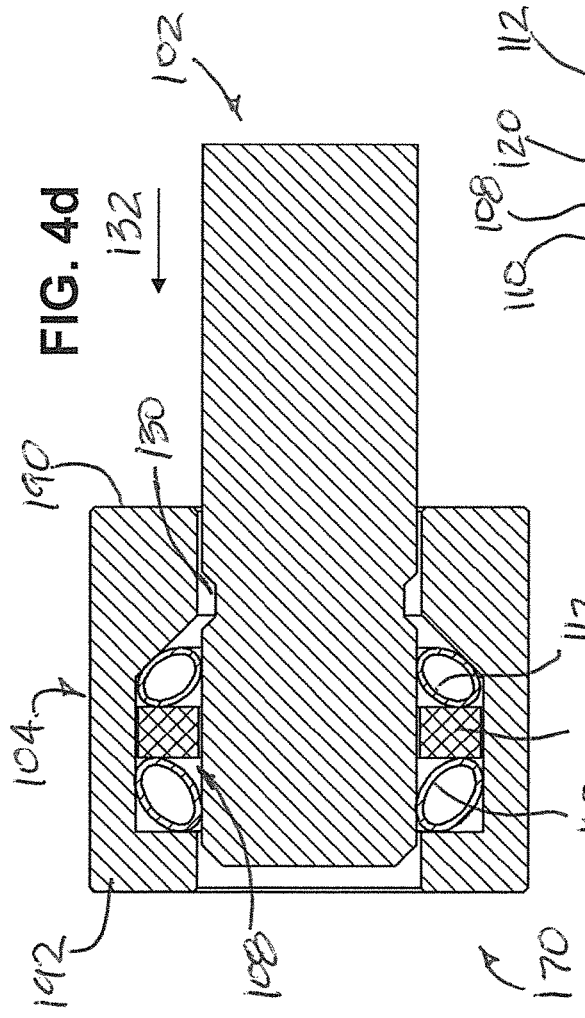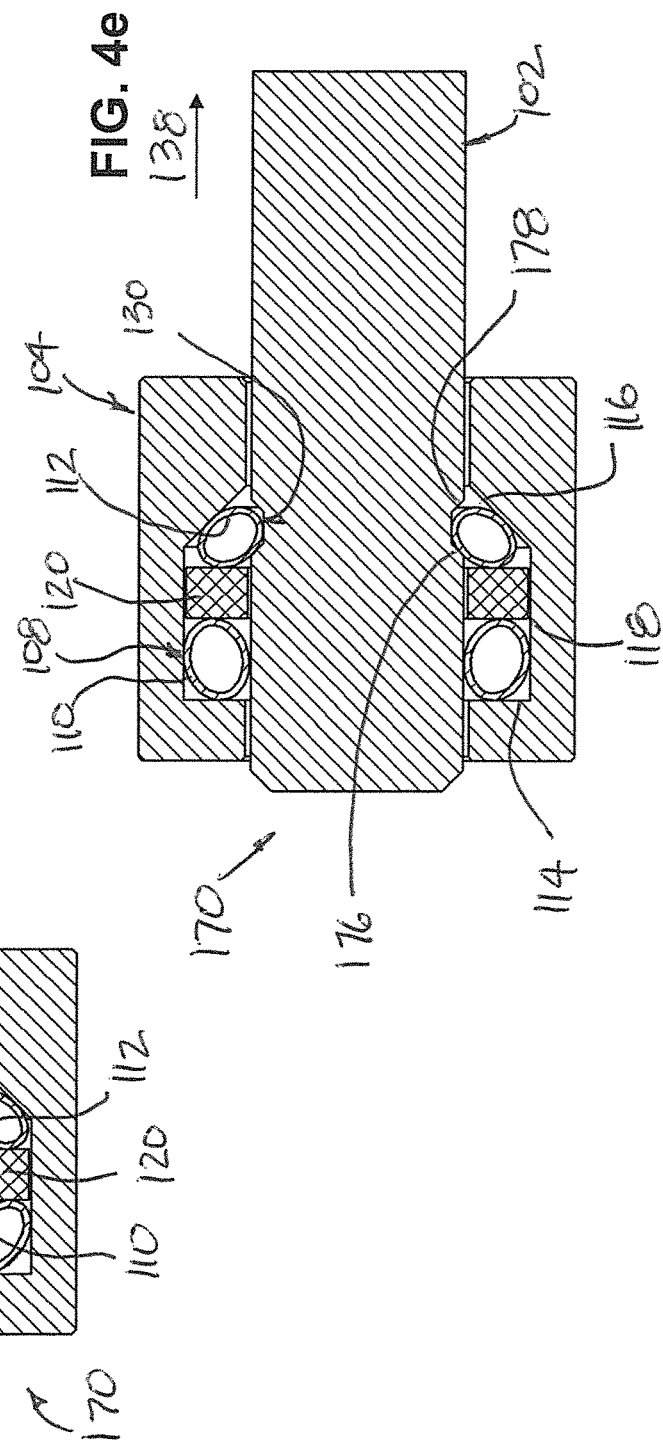

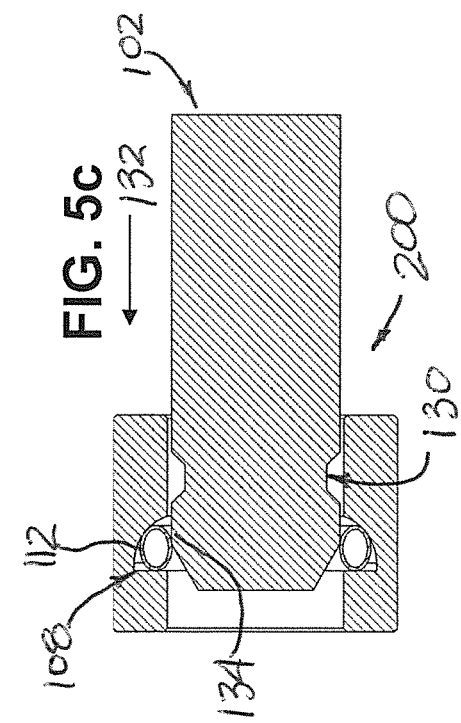
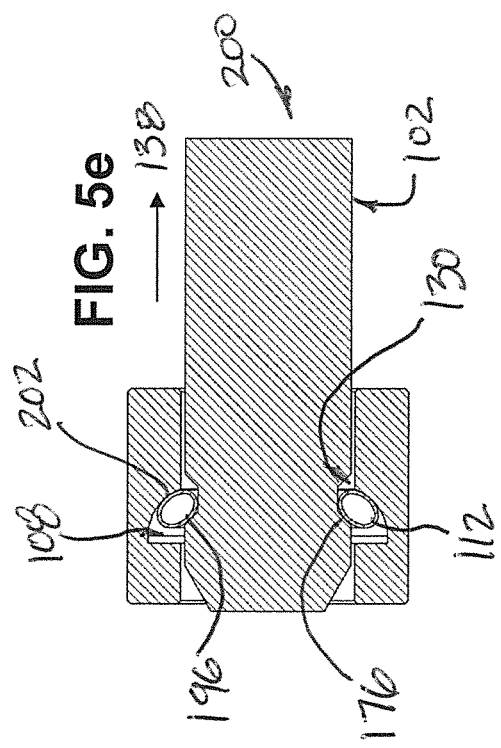
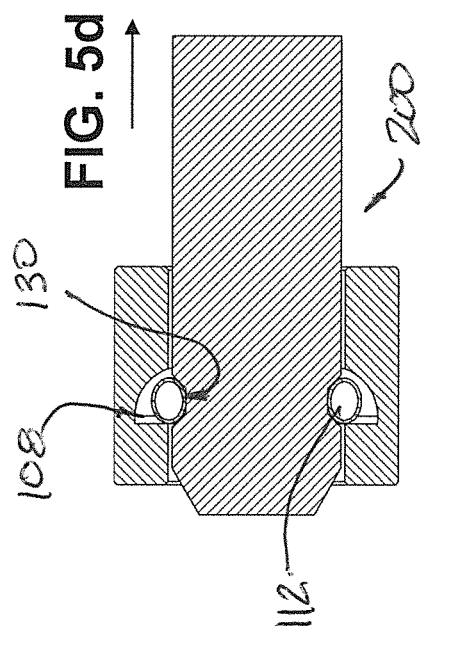
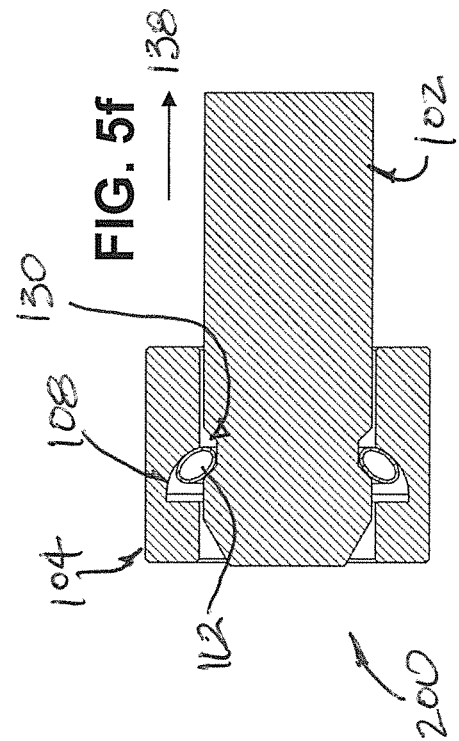

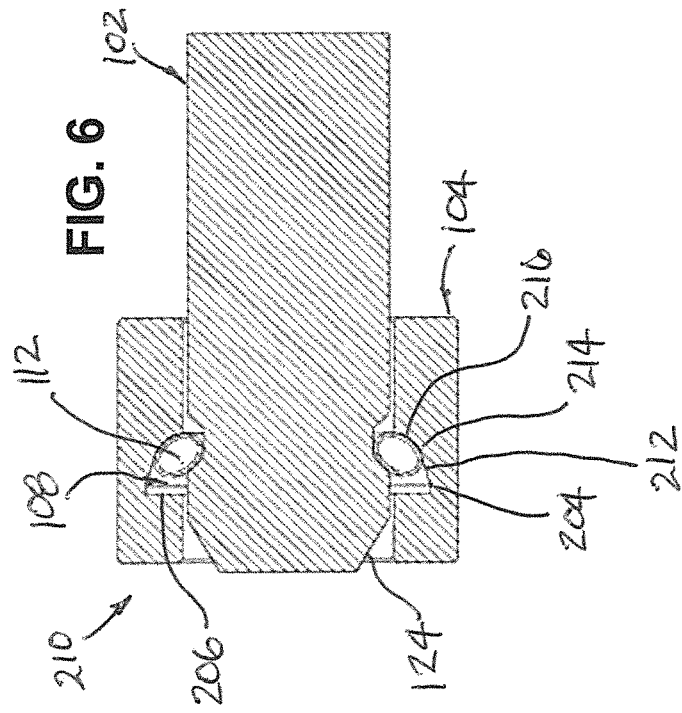
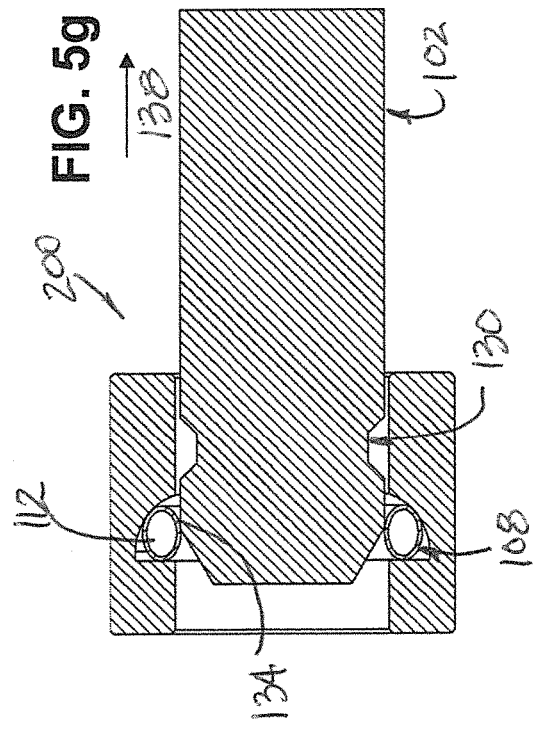
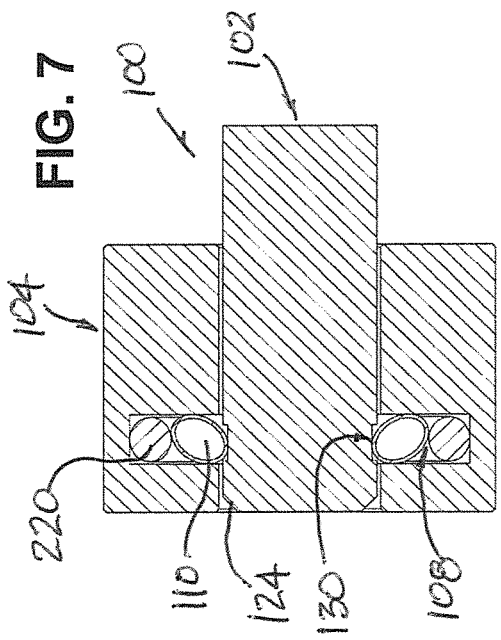

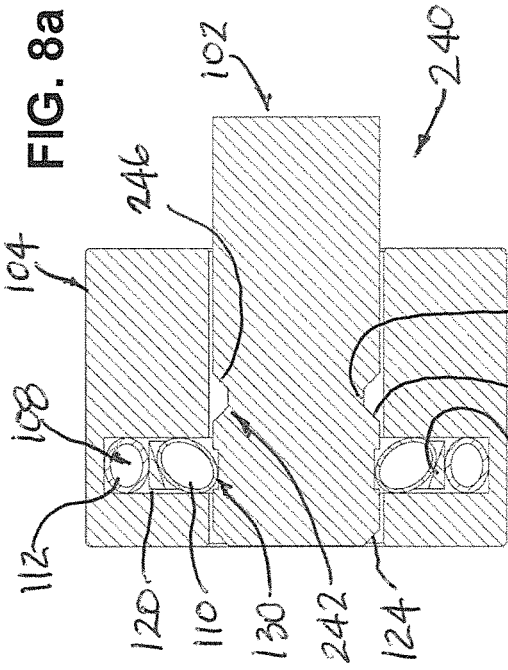
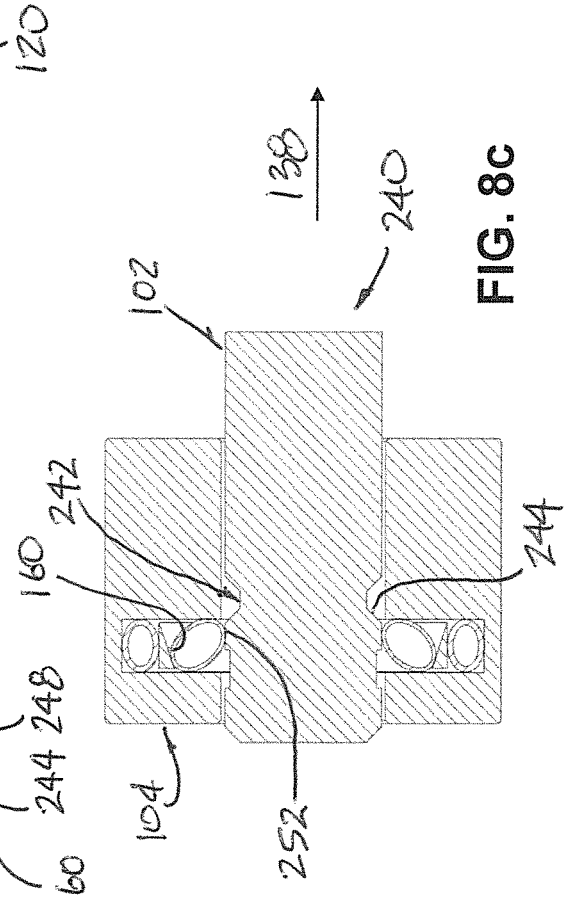

CONNECTORS WITH A PIN, A HOUSING, AND ONE OR MORE SPRINGS

FIELD OF ART

The present disclosure relates to connectors involving a housing, a pin, and a spring with particular discussions on latching connectors, connectors with relatively higher disconnect force than connect force, and connectors with canted coil springs.

BACKGROUND

Conventional connectors may use canted coil springs as the medium to latch or lock a pin and a housing together. The canted coil spring may be retained in a housing groove or pin groove with a portion of the spring coils protruding out the groove. A corresponding groove in the other component is to receive the protruding spring section and achieve latching between the pin and housing. Exemplary prior art connectors are disclosed in U.S. Pat. Nos. 8,297,662 and 8,166,623.

Higher disconnect forces compared to connect forces can be accomplished by using different groove geometries, such as incorporating tapered sidewalls, angled groove bottoms, etc., and spring configurations, such as using an axial canted coil spring versus a radial canted coil spring.

SUMMARY

The present application describes new means to achieve relatively higher disconnect force than connect force and various connectors with higher disconnect to connect force characteristics.

Aspects of the present disclosure include a connector comprising a first member, a second member, a first spring, and second spring. A first groove to retain the first spring and second spring is provided in the first member. A portion of at least one of the first or second spring protrudes out said first groove. A second groove is provided in or on the second member. Where upon connection of the second member to the first member, the first spring and second spring are inside the cavity created by the first groove and second groove. At least one of the first spring and second spring is deflected in the connected state. An increased deflection of the other first or second spring is required for disconnection of the second member from the first member.

The connector according wherein the first or second spring that protrudes out the first groove can be an axial canted coil spring.

The connector wherein the first or second spring that does not protrude out the first groove can be a radial canted coil spring.

The connector wherein the first or second spring that protrudes out the first groove has a lower deflection force than the other first or second spring.

The connector can further comprise a dividing member located between the first spring and the second spring.

The connector wherein the dividing member can comprise a slanted surface.

The connector according wherein the dividing member can move within the first groove in order to allow disconnection from the connected state.

The connector wherein the dividing member can be radially moveable within the first groove.

The connector wherein the dividing member can axially move within the first groove.

The connector wherein the first and second springs can be concentric in which one is located within the other.

The connector wherein both the first and second springs can deflect during connection of the first and second member but prior to either the first or second spring protruding into the second groove.

The connector wherein a first or second spring cross-sectional axis can be turned during connection and must be unturned during disconnection.

The connector wherein the contact point between the dividing member and the first or second spring is less than 20 degrees away from the spring major axis.

Another aspect of the present disclosure is a connector comprising a first member, a second member, and a coil spring. A first groove is provided to retain the coil spring in the first member. A portion of the coil spring protrudes out said first groove. A second groove is provided in or on the second member to accept the protruding portion of the spring. Wherein the first groove comprises a curved sidewall in order to hug and maintain the position and orientation of the coil spring within the first groove during removal.

A still further aspect of the present disclosure is a latching connector with different connect and disconnect forces. The connector can comprise a housing comprising a bore, a pin comprising a tapered insertion end, a first spring, and a second spring. A first groove can be formed in the bore of the housing having the first spring and second spring positioned therein. A portion of at least one of the first spring or the second spring protrudes out said first groove. A second groove is formed on an exterior of the pin. Wherein upon connection of the pin to the housing and biasing the two springs, the first spring, the second spring, or both the first and the second springs deflect. Wherein at least one of the first and second springs is being deflected in a connected state and increased deflection of the other first or second spring being required for disconnection of the pin from the housing.

The connector wherein the first spring or the second spring that protrudes out the first groove can be an axial canted coil spring.

The connector wherein the first spring or the second spring that does not protrude out the first groove can be a radial canted coil spring.

The connector wherein the first spring or the second spring that protrudes out the first groove can have a lower deflection force than the spring that does not protrude.

The connector can further comprise a dividing member located between the first spring and the second spring.

The connector wherein the dividing member can comprise a slanted surface.

The connector wherein the dividing member can move radially or axially within the first groove.

The connector wherein the first spring and the second spring can be concentrically positioned with the second spring surrounding the first spring.

The connector wherein the first spring, the second spring, and the dividing member can be positioned side-by-side-by-side within the first groove.

The connector wherein both the first spring and the second spring can deflect during connection of the pin to the housing but prior to either the first spring or the second spring protruding into the second groove.

The connector wherein the first spring or the second spring cross-sectional axis can be turned during connection and must be unturned during disconnection of the pin from the housing.

The connector wherein the contact point between the dividing member and the first spring or the second spring is less than 20 degrees away from the spring major axis.

A further aspect of the present disclosure is a method for controlling connect and disconnect forces in a connector. The method can comprise the steps: providing a housing comprising a bore and a housing groove; stacking two canted coil springs, which includes a first spring and a second spring, inside the housing groove and projecting the first spring into the bore; placing a pin inside the bore, the pin comprising a tapered insertion end and a pin groove; inserting the pin to the housing bore so that the tapered insertion end pushes against the projecting first spring to rotate the first spring and to exert a force against the second spring; latching the pin to the housing by capturing the first spring or the second spring between a common groove defined by the housing groove and the pin groove.

The method wherein the two springs are concentrically positioned or situated so that the first spring is to a side of the second spring along a lengthwise axis of the housing.

The method can further comprise the step of selecting the first spring or the second spring to deflect when pushing the tapered insertion end into the bore and against the projecting first spring.

The method can further comprise deflecting the first spring when inserting the pin into the housing and deflecting the second spring when unlatching the pin and removing the pin from the housing.

The method can further comprise a dividing member positioned between the first spring and the second spring.

DESCRIPTION OF DRAWINGS

These and other features and advantages of the present device, system, and method will become appreciated as the same becomes better understood with reference to the specification, claims and appended drawings wherein:

FIGS. 1a-1g show the connection/disconnection sequence of a connector having a pin and a housing with two canted coil springs, one within the other, in a deep housing groove.

FIG. 2 shows an alternative connector, similar to the connector in 1a-1g, without a divider in the deep housing groove.

FIGS. 3a-3g show the connection/disconnection sequence of an alternative connector having a pin and a housing with two canted coil springs, one within the other, in a deep housing groove with a slanted surface divider.

FIG. 4a-4f show the connection/disconnection sequence of an alternative connector having a pin and a housing with two canted coil springs located generally side-by-side within a wide housing groove.

FIG. 5a-5g show the connection/disconnection sequence of an alternative connector having a pin and a housing with a canted coil spring within a housing groove that has a curved sidewall.

FIG. 6 shows an alternative connector, similar to the connector of FIGS. 5a-5g, wherein the curved sidewall of the housing groove is modified with additional groove features.

FIG. 7 shows an alternative connector having a pin and a housing with a canted coil spring and an energizer, one within the other, in a deep housing groove.

FIGS. 8a-8c show the connection/disconnection sequence of an alternative connector having a pin and a housing with two canted coil springs, one within the other, in a deep housing groove with a slanted surface divider and with a first pin groove and a second pin groove and wherein the second pin groove is larger than the first pin groove.

DETAILED DESCRIPTION OF THE ILLUSTRATED EMBODIMENTS

Figure 1F:
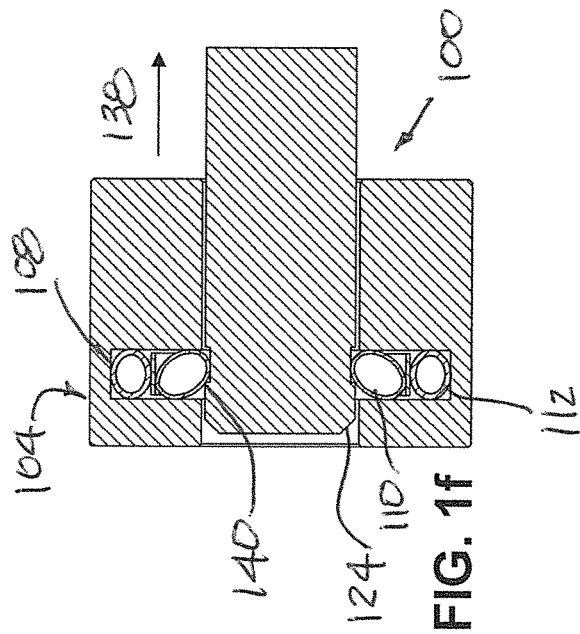

The detailed description set forth below in connection with the appended drawings is intended as a description of the presently preferred embodiments of connectors provided in accordance with aspects of the present device, system, and method and is not intended to represent the only forms in which the present device, system, and method may be constructed or utilized. The description sets forth the features and the steps for constructing and using the embodiments of the present device, system, and method in connection with the illustrated embodiments. It is to be understood, however, that the same or equivalent functions and structures may be accomplished by different embodiments that are also intended to be encompassed within the spirit and scope of the present disclosure. As denoted elsewhere herein, like element numbers are intended to indicate like or similar elements or features.

FIGS. 1a-1g show the connection/disconnection sequence for a connector 100 provided in accordance with aspects of the present disclosure. As shown, the connector 100 comprises a pin 102 and a housing 104 comprising a bore 106 sized and shaped to receive the pin 102. The bore 106 has a groove 108, also referred to as a housing groove, having two canted coil springs 110, 112, one within the other, for example concentrically positioned springs, located in the deep housing groove, i.e., a deep groove located in or on the housing. For purposes discussions, the first spring 110 may be referred to as the inner spring, being inner relative to the bore 106, and the second spring 112 may be referred to as the outer spring, being outer relative to the bore 106. In the embodiment shown, the inner spring 110 is an axial canted coil spring, which protrudes out the opening of the housing groove 108 and into the bore 106, and the outer spring 112 is a radial canted coil spring. In other examples, the two springs are either both radial springs, both axial springs, or the arrangement is reversed with the inner spring being a radial canted coil spring. Each canted coil spring is understood to include a plurality of coils all canted along the same canting direction and wherein each coil has a coil width or major axis and a coil height or minor axis. Further information regarding canted coil springs and the springs' deflection characteristics are disclosed in U.S. Pat. No. 4,655,462, the contents of which are expressly incorporated herein by reference.

As shown, the housing groove 108 is sized with a sufficient depth to accommodate two springs that are stacked into the same groove with only part of one of the springs protruding out of the opening of the housing groove. If the housing 104 has a lengthwise axis extending between the two open ends of the bore 106, in the embodiment shown, the two springs are stacked along the same axial location of the housing, i.e., concentrically positioned.

In one example, the housing groove 108 comprises two sidewalls 114, 116 and a bottom wall 118 located therebetween. The groove width is sized such that the inner spring 110 contacts the two groove sidewalls 114, 116. In an example, the bottom wall 118 is generally parallel to the housing lengthwise axis. In another example, the bottom wall 118 is tapered relative to the lengthwise axis. Alternatively, the bottom wall 118 can be curved or has two slanted surfaces. The two sidewalls 114, 116 are generally parallel to one another. In other examples, the two sidewalls slightly converge in the direction of the housing bore or slightly diverge in the direction of the housing bore.

A divider or band 120 is shown positioned in the housing groove 108 with the two springs 110, 112. As shown, the divider 120 is positioned between the two springs and separates the inner spring 110 from the outer spring 112. In an embodiment, the outer spring 112 is a radial spring and has a higher deflection force than the deflection force of the inner spring 110, which is understood to require more force to deflect the coils of the outer spring 112 than for the force to deflect the coils of the inner spring 110 by the same deflection amount or value. In other examples, the deflection force required is reversed or the amount is the same for both springs. The divider 120 may be an elastomeric band or made from polymeric/plastic material or metal and may be cut at one segment to allow increase or decrease in diameter, such as to allow for compressing the divider to then insert into the groove 108. Viewed differently, the divider 120 can resemble a wedding band with a section of the band removed to allow for increase or decrease in diameter of the band for installation purposes and during use. In other examples, the divider 120 can embody two or more separate arcuate sections that are placed inside the groove 108 and then held therein by the inner spring 110. In one example, the thickness of the band can vary to increase or decrease the depth of the groove 108 and to increase or decrease the remaining space for accommodating the two springs. The width of the divider or band 120 should be sufficiently small to fit within the width of the housing groove 108, preferably without simultaneously touching both sidewalls 114, 116 of the housing groove. The divider 120 may be understood to be a variable device in that it is movable within the housing groove 108 to allow the two springs to deflect, as further discussed below. The divider 120 may also be understood to be a support surface for supporting the first canted coil spring 110 inside the housing groove. As shown, the support surface is generally planar. In other examples, the surface can have a taper or a curve.

The pin 102, which may alternatively be referred to as a shaft or a rod, has a tapered insertion end 124, a pin body 126 having a length along a lengthwise axis, a diameter, and an exterior surface having a pin groove 130 formed thereon. The pin groove 130 is configured to accept the protruding portion of the inner spring 110 upon latching connection, as further discussed below. In some examples, the housing groove 108 may be referred to as the first groove and the pin groove 130 as the second groove.

In one example, the pin groove 130 has a shallow groove with a flat bottom wall and two generally parallel sidewalls to permit latching and unlatching without plastically deforming the spring. Said differently, the shallow pin groove 130 is configured to push the two springs further into the housing groove upon retraction to allow the pin to separate from the housing. In an alternative example, the pin groove 130 is a V-groove. The pin groove may yet have two tapered side walls with a bottom wall located therebetween. In some embodiments, both tapered side walls simultaneously contact the inner spring 110 when the pin 102 is latched to the housing 104. In other embodiments, the tapered side walls of the alternative pin groove do not simultaneously contact the inner spring 110 when the pin 102 is latched to the housing 104.

The pin 102 may be latched to the housing 104 by first pushing the insertion end 124 along the first direction 132 into the housing bore 106, as shown in FIG. 1a. It is understood that the pin 102 may alternatively be kept stationary and the housing 104 moved in the second direction 138 to latch the pin to the housing or both the pin and the housing may move towards one another to latch the pin to the housing. For discussion purposes, the housing 104 is kept stationary while the pin 102 moves.

FIG. 1b shows the pin 102 further inserted into the bore 106 along the first direction 132 to the point in which the tapered insertion end 124 contacts and pushes against the inner spring 110 and rotating the inner spring.

FIG. 1c shows the pin 102 still further inserted into the bore 106 along the first direction 132 and beyond the tapered insertion end 124 and around the landing 134 just before the pin groove 130. At this point, the inner spring 110 is further turned and canted or deflected by the width of the pin 102. In the embodiment shown, the outer spring 112 has a higher deflection force than the inner spring 110 and thus there is minimal or less deflection experienced by the outer spring compared to the deflection experienced by the inner spring 110. Said differently, most if not all of the deflections to permit clearance for the girth of the pin 102 to be inserted into the bore 106 and through the inner spring 110 will be taken up by the inner spring 110 due to the relative deflection characteristics of the two springs. In other embodiments, the outer spring 112 is sized and shaped to have the same or lower deflection force than the inner spring 110 so that the total deflection is distributed, in some ratio depending on the deflection characteristics of the two springs, or transferred completely to the outer spring 112.

FIG. 1d shows the connector 100 in a latched state. More specifically, the pin 102 is still further inserted into the bore 106 of the housing until the inner spring 110 is latched into the pin groove 130. The inner spring 110 can be said to expand from its more canted state to a less canted state to seat against the constraint of the pin groove 130 to latch the pin to the housing. As shown, even if the pin 102 is moved in the second direction or the withdraw direction 138 in an attempt to remove the pin from the housing, the contact point 140 between the sidewall of the pin groove 140 and the inner spring 110 is too close to the major axis of the inner spring to compress or lift the inner spring. As is readily understood, the coils of the canted coil spring 110 cannot deflect when a force is applied at or near one of the ends of the coils' major axes. As such, at this state, the pin 102 cannot be removed from the housing 104 without deflecting the outer spring 112. In other words, one or the other spring must deflect in order for the pin to unlatch. Again, due to the location of the contact point 140 (FIG. 1d) between the pin groove 130 and the inner spring 110, the inner spring 110 cannot deflect along the major axis, i.e., the longer of two axes. Thus, the outer spring 112 needs to deflect. Since the distance between the bottom of the pin groove 130 and the inner surface of the divider 120 is less than the length of the inner axial spring major axis, removal of the pin 102 without further deflection of the outer spring 112 or damage to the inner spring 110 is not possible.

Thus, as described, an aspect of the present connector is understood to include a housing 104 having a bore 106 and a housing groove 108 located therein having two canted coil springs that are stacked inside the housing groove, which includes a first spring 110 and a second spring 112, which are both canted coil springs, and wherein at least part of the first spring projects out of the housing groove and into the bore. A pin 102 having a pin groove 130 is disposed inside the bore and captures at least part of the first spring 110 that projects into the bore in the pin groove. Wherein the first spring 110 is deflectable but the second spring 112 is not deflectable when the pin is inserted in a first direction 132 to latch the pin to the housing. Wherein the first spring 110 is not deflectable but the second spring 112 is deflectable when the pin is removed in a second direction 138, which is opposite the first direction, to remove the pin from the housing. In another example, both the first spring 110 and the second spring 112 deflect when the pin is moved in the first direction to latch the pin to the housing and again in the second direction to remove the pin from the housing.

The present disclosure is also understood to include a method for controlling connect and disconnect forces in a connector comprising a housing and a pin by stacking two canted coil springs into a housing groove and selecting which of the two springs to deflect when the pin is inserted, or moved in a first direction, into the housing and which to deflect when the pin is moved in the opposite direction, or moved in the second or withdraw direction, to separate from the housing. In a specific example, the spring that deflects when the pin is inserted may have a lower deflection force than the spring that deflects when the pin is withdrawn from the housing.

Figure 1E:
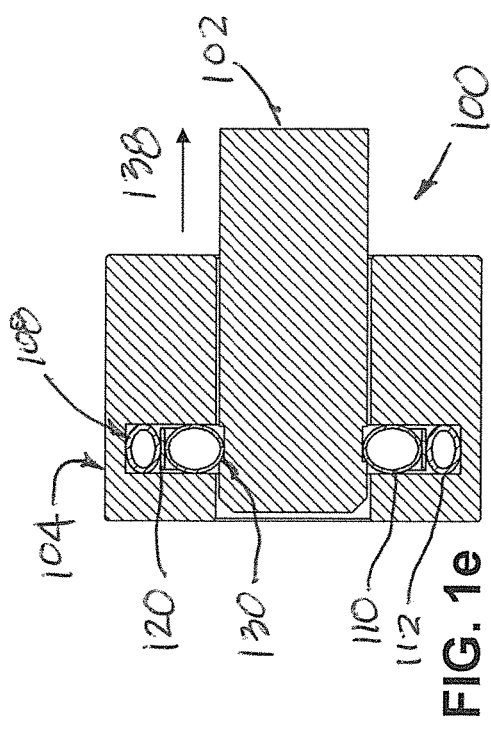

FIG. 1e shows the pin 102 starting to be removed as indicated by the rotation of the inner spring 110 to a more vertical position and the deflection of the outer spring 112 to a more canted position. To reach this position, the pin 102 must be pulled in the second or withdraw direction 138, which causes the sidewall of the pin groove 130 at contact point 140 to turn the inner axial spring back to being in a more straight orientation. The withdraw arrow 138 in FIG. 1e indicates the direction of the pull, which is opposite the direction of the insertion arrow 132 shown in FIGS. 1a-1c. Since space or the gap between the pin groove bottom and the housing groove bottom is constant and the inner spring 110 cannot compress along its major axis, deflection of the outer radial spring 112 must occur to give the inner axial spring 110 sufficient room to rotate from a first angular position to a second angular position, for example to straighten as shown in FIG. 1e. From this position, the pin can be fully removed from the housing since any additional withdraw force can now force the inner spring 110 to further rotate, as shown in FIG. 1f. Note that the outer spring 112 will experience its highest deflection at the position shown in FIG. 1e and will start to relax, i.e., less cant, upon moving to FIG. 1f.

Figure 1G:
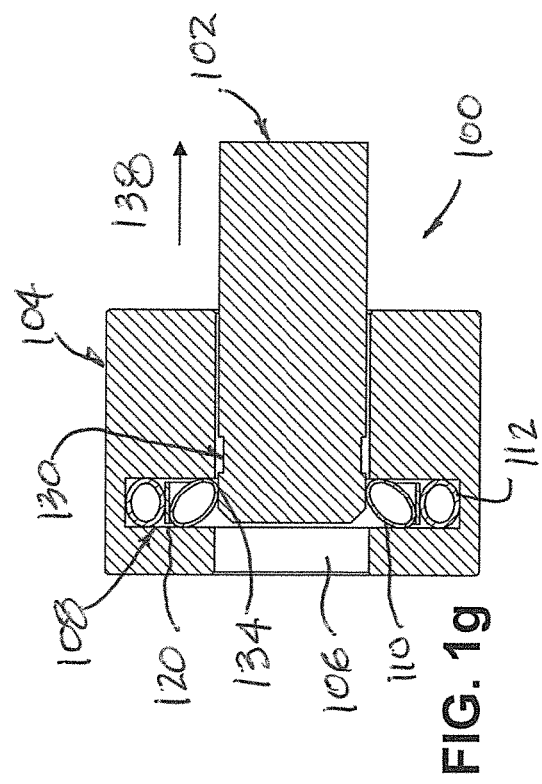

At the position shown in FIG. 1f, the contact point 140 between the sidewall of the pin groove 130 and the inner spring 110 is now further away from the major axis, which can now deflect the coils of the inner spring 110 upon further movement of the pin in the second direction 138 to FIG. 1g. Note that the force to remove the pin 102 from the housing 104 will be larger than the force to insert the pin to latch the pin to the housing since insertion along the first direction 132 does not require the outer spring 112 to deflect whereas upon withdraw in the second direction 138, the outer spring 112, which has a higher deflection force than the inner spring 110, will need to deflect to allow the pin to separate from the housing. This ensures that the connect force is lower than the disconnect force.

In some examples, the inner spring 110 may be sized with a certain coil spacing or coil density, may be rotated so that the contact point 140 is closer to the major axes of the coils, or use with a pin groove 130 that has a contact point 140 with the spring near the coils' major axes, so that the force to deflect the inner spring 110 equals the force to deflect the outer spring 112. If so, both springs 110, 112 will deflect upon withdraw of the pin. In still yet other examples, the inner spring 110 has a higher deflection force than the outer spring 112 so that only the outer spring deflects during both insertion and removal of the pin. In still yet other embodiments, the inner and outer springs can be sized to provide a factor of 1.3 times to about 30 times more force, or even higher, to remove the pin (i.e., high disconnect force) from the housing than to insert and latch the pin to the housing (i.e., low connect force). For certain applications, such as for safety purposes, the insertion force can be made to be relatively high and the removal force to be even higher. For example, a socket can be made to be difficult to use, such as to insert, to prevent inadvertent electrocution.

Thus, an aspect of the present disclosure and method is understood to include a housing groove 108 sized and shaped to accommodate two stacked canted coil springs having a variable device to vary the space or room within the housing groove 108 for the inner spring of the two stacked springs to rotate. In one example, the variable device is a divider 120 that is movable or deflectable to provide the added space for the inner spring. In a particular example, the divider 120 is positioned adjacent an outer spring 112 and the outer spring is deflectable to allow room for the moving divider 120, which then provides room for the inner spring 110. The newly created space, gap, or room provided by the variable device gives the inner spring 110 the needed space to rotate so that the pin 102 can retract during disconnection. Said differently, if the divider 120 is not deflectable or variable, then the divider acts like a fixed bottom wall of a typical housing groove, which will not yield and therefore will not permit the axial spring to rotate. This in turn would lead to a locking connector, which does not permit separation of the pin from the housing unless the spring is plastically deformed.

Thus, the divider 120 disclosed herein is deflectable and acts like a false bottom that is movable or variable to permit clearance or space for the inner spring to rotate from a first position (FIG. 1d) which does not permit removal of the pin from the housing, to a second generally vertical or straight position (FIG. 1e), and then to a third position (FIG. 1f), which allows the pin to be removed from the housing. In an example, the inner spring movement comprises a rotational movement. In an embodiment, the rotational movement is only possible by having a support surface that contacts the inner spring to deflect or move. In still yet another example, the support surface, which can be a divider, and a second canted coil spring deflects to permit the first or inner spring to rotate.

The present connector is further understood to include a housing comprising a bore and a housing groove, a pin disposed in the bore comprising a pin groove, and a canted coil spring located, at least in part, in both the housing groove and the pin groove when the pin is connected to the housing, and wherein the housing groove comprises a variable device that is movable to enable the canted coil spring to rotate.

Wire types usable herein include copper, copper alloy, aluminum, aluminum alloy, gold, gold alloy, silver, silver alloy, brass, and brass alloy. Additional wires include steel material, such as medical grade stainless steel, titanium, noble metals such as platinum or conventional implantable grade materials with noble metal coatings, such as platinum over stainless steel. The wire may also be a multi-metallic wire in which a base core material is surrounded by one or more other materials. In some examples, the spring has an inner core and an outer layer having different material compositions with the outer layer comprising at least one of platinum, iridium, rhodium, rhenium, ruthenium and palladium. The outer layer should have sufficient thickness to provide the spring with an electrical resistance that is within 20% or less of a spring made entirely of at least one of platinum, iridium, rhodium, rhenium, ruthenium and palladium. For electrical connector applications, the spring may be used with a housing and a pin or shaft made from stainless steel type 316L, MP35N, platinum-iridium, titanium or other conductive materials.

FIG. 2 shows an alternative connector 100, which is similar to the connector in FIGS. 1a-1g but without a divider 120. The connector comprises a pin 102 and a housing Thus, the variable device of FIG. 2 is understood to be part of the outer spring 112. Said differently, for the embodiment of FIG. 2, the support surface is generally arcuate, which describes the curvature of each spring coil of the outer spring 112. The divider 120 shown in FIGS. 1a-1g is not necessary to transmit load and displacement between the inner and the outer springs 110, 112. The inner and outer springs 110, 112 can be oriented so that the coils are canted in opposite directions, thus reducing the likelihood that the spring coils in one spring may wedge between coils of the other spring. Other than the divider 120, the connector of FIG. 2, such as characteristics of how the two springs deflect and the different permutations, is the same as for the embodiment of FIGS. 1a-1g.

For other connector embodiments disclosed herein below, it is understood that where a feature is shown but not expressly described and is otherwise the same or similar to the feature or features described elsewhere, such as above with reference to FIGS. 1a-2, the disclosed part or parts shown in the drawing figures but not expressly described because of redundancy, may nonetheless be understood to be described or taught by the same or similar features expressly set forth in text for the embodiments in which the feature or features are described, such as that of FIGS. 1a-2. Said differently, subsequent disclosures of the present application are built upon the foundation of earlier disclosures unless the context indicates otherwise. The disclosure is therefore understood to teach a person of ordinary skill in the art the disclosed embodiments without having to repeat similar components in all embodiments. Said differently, the same or similar features shown in the following connectors incorporate the teachings of the embodiments of FIGS. 1a-2 unless the context indicates otherwise. In other words, later embodiments enjoy the benefits of earlier described embodiments unless the context indicates otherwise.

FIGS. 3a-3g show the connection/disconnection sequence for an alternative connector provided in accordance with an alternative embodiment of the present disclosure, which is generally designated 100. As shown, the connector 100 comprises a pin 102 and a housing 104 comprising a bore 106 sized and shaped to receive the pin 102. The bore 106 has a housing groove 108 having two canted coil springs 110, 112, one within the other, located in the deep housing groove, i.e., a deep groove located in or on the housing. Like the embodiments of FIGS. 1a-1g and FIG. 2, the inner spring 110, closer to the pin or central bore, is an axial spring, which protrudes out the deep housing groove 108. The present embodiment is similar to the embodiment of FIGS. 1a-1g with the exception of the divider. In the present embodiment, the divider 120, which may also be called a variable device, has a slanted inner surface 160 and is positioned in the housing groove 108 to separate the inner spring 110 from the outer spring 112, which is a radial spring and has a higher deflection force than the inner axial spring. However, different combination of spring deflections and spring types as discussed above with reference to FIGS. 1a-1g are possible. In cross-section, the divider 120 resembles a wedge and has a slanted surface 160 and a flat surface 162.

In an example, the slanted inner surface 160 of the divider 120 is preferably in contact with the inner spring 110. The divider 120 may be an elastomeric band or made from polymeric/plastic material or metal and may be cut at one segment to allow increase or decrease in diameter. However, the divider 120, like the divider of FIGS. 1a-1g, may embody two or more separate sections that are placed into the housing groove. As further discussed below, the slanted surface 160 of the divider 120 helps the inner spring 110 to rotate during insertion of the pin to facilitate latching the pin 102 to the housing 104 but opposes the spring 110 counter rotation to unlatch the pin from the housing, which represents an additional method for ensuring a higher disconnect force to unlatch the pin from the housing than a connect force to latch the pin to the housing. In another example, the slanted surface 160 contacts the outer spring 112.

Like the sequence of FIGS. 1a-1g, the pin 102 shown in FIG. 3a may be latched to the housing 104 by first pushing the insertion end 124 along the first direction 132 into the housing bore 106. FIG. 3b shows the pin 102 further inserted into the bore 106 along the first direction 132 to the point in which the tapered insertion end 124 contacts and pushes against the inner spring 110 and starts to rotate the inner spring 110 from its starting position (FIG. 3a) to its first rotated position (FIG. 3b). The tapered insertion end 124 acts like a ramp to facilitate rotating the spring 110.

Figure 3C:
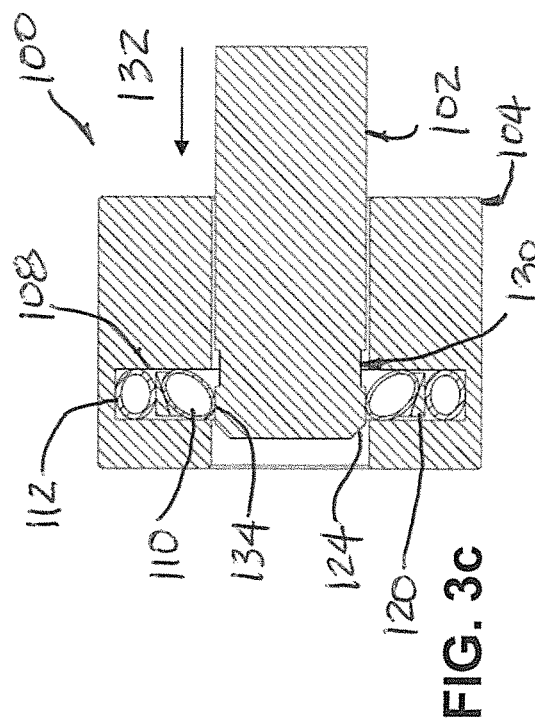

FIG. 3c shows the pin 102 still further inserted into the bore 106 along the first direction 132 and beyond the tapered insertion end 124 and around the landing 134 just before the pin groove 130. At this point, the inner spring 110 is further turned and canted or deflected by the width of the pin 102. In the embodiment shown, the outer spring 112 has a higher deflection force than the inner spring 110 and thus there is minimal or less deflection compared to the deflection experienced by the inner spring 110. Said differently, most if not all of the deflections to permit clearance for the pin 102 to be inserted into the bore 106 and through the inner spring 110 will be taken up by the inner spring 110 due to the relative deflection characteristics of the two springs. In other embodiments, the outer spring 112 is sized and shaped to have the same or lower deflection force than the inner spring 110 so that the total deflection is distributed, in some ratio depending on the deflection characteristics of the two springs, or transferred completely to the outer spring 112.

Figure 3D:
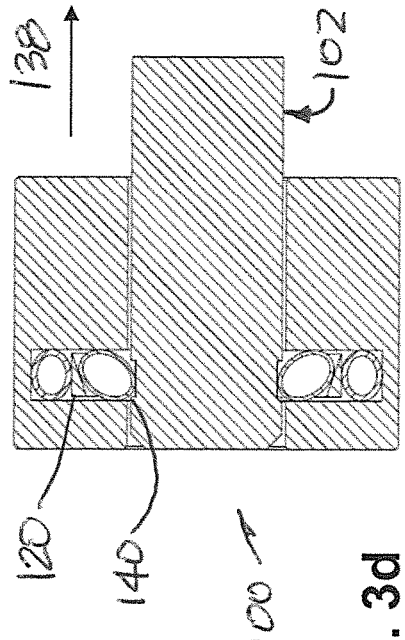

FIG. 3d shows the connector 100 in a latched state. More specifically, the pin 102 is still further inserted into the bore 106 of the housing until the inner spring 110 is latched into the pin groove 130. The inner spring 110 can be said to expand from its more canted state to a less canted state to seat against the constraint of the pin groove 130 to latch the pin to the housing. As shown, even if the pin 102 is moved in the second direction or withdraw direction 138 in an attempt to remove the pin from the housing, the contact point 140 between the sidewall of the pin groove 140 and the inner spring 110 is too close to the major axis of the inner spring to compress or lift the inner spring. As such, at this state, the pin 102 cannot be removed from the housing 104 without deflecting the outer spring 112.

Thus, the present disclosure is understood to include a method for controlling connect and disconnect forces in a connector comprising a housing and a pin by stacking two canted coil springs into a housing groove and selecting which of the two springs to deflect when the pin is inserted, or moved in a first direction, into the housing and which to deflect when the pin is moved in the opposite direction, or moved in the second or withdraw direction, to separate from the housing. In a specific example, the spring that deflects when the pin is inserted may have a lower deflection force than the spring that deflects when the pin is withdrawn from the housing. A still further aspect of the present embodiment is a divider 120 located between the two springs 110, 112 to act as a ramp to facilitate the inner spring rotation during insertion of the pin into the housing. The slanted divider allows more room on one side of the groove 108 for the inner spring 110 to deflect into, such as to rotate into the extra room provided by the space provided by incorporating the slanted divider, which reduces the required insertion force.

Figure 3E:
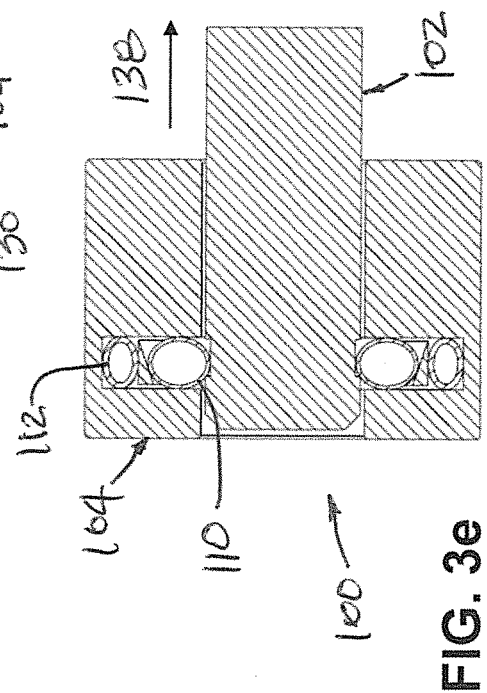

FIG. 3e shows the pin 102 starting to be removed as indicated by the rotation of the inner spring 110 to a more vertical position and the deflection of the outer spring 112 to a more canted or deflected position compared to, for example, the position of the outer spring in FIG. 3c or FIG. 3d. To reach this position, the pin 102 must be pulled in the second or withdraw direction 138, which causes the sidewall of the pin groove 130 at contact point 140 to turn the inner axial spring back to being in a more straight orientation. The withdraw arrow 138 in FIG. 3e indicates the direction of the pull, which is opposite the direction of the insertion arrow 132 shown in FIGS. 3a-3c. Since space or the gap between the bottom of the pin groove 130 and the bottom of the housing groove 108 is constant and the inner spring 110 cannot compress along its major axis, deflection of the outer radial spring 112 must occur to give the inner axial spring 110 sufficient room to rotate from a first angular position to a second angular position, for example to straighten as shown in FIG. 3e. Additionally, for the inner spring 110 to rotate in the counter-clockwise position, viewed from the perspective of the top coil section of FIGS. 3d and 3e, it must rotate against the slanted surface 160 of the divider 120. This in turn requires additional force to overcome and therefore increases the disconnect force to move the pin.

Figure 3F:
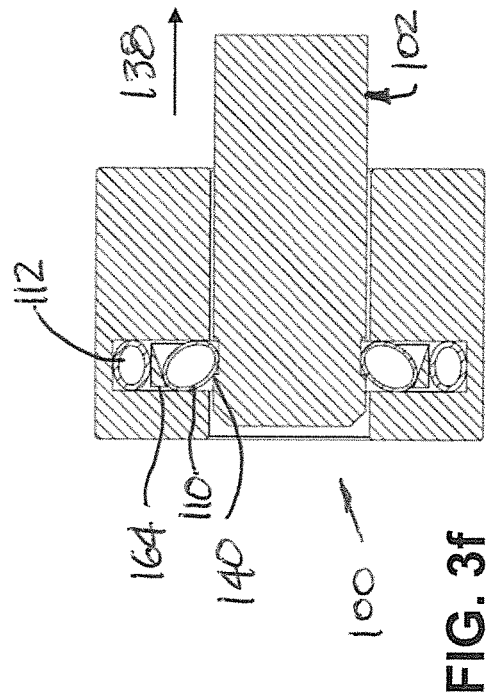

From this position, the pin 138 can be fully removed from the housing since any additional withdraw force can now force the inner spring 110 to further rotate, as shown in FIG. 3f. Also, due to the thickness at the base 164 of the divider 120, additional space within the housing groove 108 is taken up by the divider. Thus, the inner spring 110, the outer spring 112, or both inner and outer springs must deflect a combined amount that is more than when the divider is generally flat or when not incorporated in order to for the inner spring to rotate from the position shown in FIG. 3e to the position shown in FIG. 3f. Note that the outer spring 112 will experience its highest deflection at the position shown in FIG. 3e and will start to relax, i.e., less cant, upon moving to FIG. 3f.

At the position shown in FIG. 3f, the contact point 140 between the sidewall of the pin groove 130 and the inner spring 110 is now further away from the major axis, which can now deflect the coils of the inner spring 110 upon further movement of the pin in the second direction 138 to FIG. 3g. Also, as the inner spring 110 is angled against the slanted surface 160 of the divider 120, a higher force is requires compared to when the surface is flat or where more space is available, at least the inner spring 110 and possibly the outer spring 112 will deflect upon removal of the pin 102 from the housing 104. Note that the force to remove the pin 102 from the housing 104 will be larger than the force to insert the pin to latch the pin to the housing since insertion along the first direction 132 does not require the outer spring 112 to deflect whereas upon withdraw of the pin in the second direction 138, the outer spring 112, which has a higher deflection force than the inner spring 110, will need to deflect to allow the pin to separate from the housing.

Thus, an aspect of the present disclosure and method is understood to include a housing groove 108 sized and shaped to accommodate two stacked canted coil springs having a variable device to vary the space or room within the housing groove 108 for the inner spring of the two stacked springs to rotate. In one example, the variable device is a divider 120 that is movable or deflectable to provide the added space for the inner spring. In a particular example, the divider 120 is positioned adjacent an outer spring 112 and the outer spring is deflectable to allow room for the moving divider 120, which then provides room for the inner spring 110. The newly created space, gap, or room provided by the variable device gives the inner spring 110 the needed space to rotate so that the pin 102 can retract during disconnection. Said differently, if the divider 120 is not deflectable or variable, then the divider acts like a bottom wall of a typical housing groove, which will not yield and therefore will not permit the axial spring to rotate. This in turn would lead to a locking connector, which does not permit separation of the pin from the housing unless the spring is plastically deformed. In the present embodiment, the variable device has a wedge-shape cross section. As shown, the variable device is a divider comprising a slanted surface 160, a flat surface 162 opposing the slanted surface, and an enlarged base 164. In an example, the slanted surface is arranged to contact the inner spring 110. The wedge shape divider 120 has a pointed tip that preferably faces the opening of the bore 106 that the pin enters to latch to the housing.

Thus, the divider 120 disclosed herein is deflectable and acts like a false bottom that is movable or variable to permit clearance or space for the inner spring to rotate from a first position (for example FIG. 1d) which does not permit removal of the pin from the housing, to a second generally vertical or straight position (for example FIG. 1e), and then to a third position (for example FIG. 1f), which allows the pin to be removed from the housing. In an example, the inner spring movement comprises a rotational movement. In an embodiment, the rotational movement is only possible by having a support surface that contacts the inner spring to deflect or move. In still yet another example, the support surface, which can be a divider, and a second canted coil spring deflects to permit the first or inner spring to rotate. The divider 120 can have a slanted surface 160 so that rotation of the inner spring 110 away from the slanted surface during insertion of the pin 102 can reduce the insertion force compared to a divider with a flat surface that the inner spring rotates against.

The present connector is further understood to include a housing comprising a bore and a housing groove, a pin disposed in the bore comprising a pin groove, and a canted coil spring located, at least in part, in both the housing groove and the pin groove when the pin is connected to the housing, and wherein the housing groove comprises a variable device that is movable to enable the canted coil spring to rotate. In an example, the variable device has a slanted surface that contacts the inner spring. In another example, the point tip of the variable device is arranged in the groove to point in the direction of the bore opening that receives the pin for latching. This slanted surface 160 results in a higher removal force and therefore a higher removal to insertion force ratio may be achieved.

FIGS. 4a-4f show the connection/disconnection sequence for an alternative connector 170 provided in accordance with further aspects of the present device and method. As shown, the connector 170 comprises a pin 102 and a housing 104 comprising a bore 106 sized and shaped to receive the pin 102. The housing has a housing groove 108 located in the bore 106 comprising a bottom wall 118 located between two sidewalls 114, 116. The groove is sized and shaped to receive two canted coil springs 110, 112 in a side-to-side arrangement. The housing groove 108 comprises a straight sidewall 114 and a tapered or slanted sidewall 116 closer to the inlet opening 172 of the housing bore. In one example, the first spring 110 is positioned against the straight sidewall 114, which in the present embodiment is an axial canted coil spring with a portion protruding out the groove and into the bore 106. A divider 120 separates the first spring 110 from the second spring 112, which is positioned against the tapered sidewall 116. The groove constraints and the tapered sidewall 116 force the second spring 112 to remain tilted at an angle throughout the operation of the connector, as further discussed below.

The pin 102 shown in the present embodiment comprises a pin groove 120 having a V-groove having two tapered sidewalls 176, 178 subtended by a flat bottom wall 180. In other examples, the second tapered sidewall 178 is straight or normal relative to the pin axis. The pin groove 120 can also be a V-groove without the flat bottom wall. In still yet other examples, the pin groove is similar to that of FIG. 1a, which has a flat bottom wall and two generally parallel sidewalls.

FIG. 4a represents the start of the insertion process to latch the pin 102 to the housing 104.

FIG. 4b shows the pin 102 further inserted into the inlet opening 172 of the bore 106 along the first direction 132 to the point where the tapered insertion end 124 is just about to contact the protruding portion of the first spring 110. At this point, the pin 102 is sized such that it does not materially disturb, if any, the second spring 112 or the divider 120.

FIG. 4c shows the pin 102 being inserted further into the housing 104 along the first direction 132. The tapered insertion end 124 of the pin 102 contacts, turns, and deflects the first axial spring 110. To vary the space or room for the first spring 110 to rotate, the divider 120 is movable within the width of the housing groove 108 and is moved when pushed by the rotating first spring 110 towards the second spring 112. The total deflection amount to provide sufficient clearance for the width of the pin 102 may be distributed, within the confines of the groove, between the two springs 110, 112. In some examples, the divider is compressible so that the divider can take up some of the deflections (i.e., can compress to provide additional space for the two springs).

FIG. 4d shows the running state of the insertion of the pin 102 further into the housing 104. Both springs 110, 112 are being deflected at this point. If the pin 102 is stopped in this position, the pin is said to be held in the housing by the friction and force generated by both springs 110, 112 on the pin outer surface. In an alternative embodiment, the deflection force characteristics of the two springs may be adjusted, such as using different wire types or wire diameters, using different back angle, different front angle, different coil shapes, using different coil spacing, etc., so that one spring deflects more than the other, both springs deflect equally, or only one of the two springs deflect. Depending on the amount of deflection for each of the two springs, the divider 120 will either shifts towards the first end 190 of the housing or the second end 192 of the housing 104.

FIG. 4e shows the connector in a latched state with the second spring 112 being captured by both the housing groove 108 and the pin groove 130. The pin groove 130 has provided more room for the second spring 112 to at least partially relax. The added available space also allows the first spring 110 to partially relax, however turning further, and pushing the divider 120 even closer towards the tapered sidewall 116. Said differently, the overall space for accommodating the two springs 110, 112 and the divider 120 is increased at the latched state, which allows for both springs to deflect less compared to the position shown in FIG. 4d.

Pin removal from this latched state requires high force for at least the following two reasons: Firstly, since the second spring 112 is tilted and deflected between two tapered surfaces 116, 176, which may be parallel or close to parallel, there are minimal forces pushing the spring out of the pin groove. Thus, a large amount of deflection may be required before the spring "jumps" out of the pin groove 130 and back into the housing groove 108 to begin the pin retraction. The two tapered surfaces 116, 176, being parallel or close to parallel to one another, have the tendency to further compress the second spring 112 therebetween but for the relative contacts of the first tapered surface 176 of the pin groove and the tapered surface 116 of the housing groove on the second spring 112. The offset in contact between the tapered surface 176 of the pin groove and the second spring 112 forces the second spring 112 to rotate in the counter-clockwise direction, viewing from the perspective of the upper section of the second spring 112, to jump out of the pin groove 130. Secondly, the first spring 110 relaxing into the added available space in this state has resulted in some turning or rotating of the spring within the housing groove 108 such that an end of the spring major axis, i.e., the larger of the two axes, is close to the contact point between the first spring 110 and the divider 120. This makes it difficult to impart an angular force on the first spring 110 to counter rotate the first spring 110.

Thus, upon pulling the pin 102 in the second direction 138, the force from the second spring 112 "jumping" out the pin groove will translate to the divider 120, which in-turn will translate into only an axial force against the first spring 110. Since a force applied close to the major axis, the coil width of the spring is not deflectable, has much less effect on the deflection of the spring (the force vector is small along the minor axis and large along the major axis), a large force is required to deflect and turn the spring back. Thus, a purposeful high disconnect force is needed to turn the first spring 110 during pin removal. The combination of high removal resistance from both springs 110, 112 contributes to the relatively high force threshold that must be overcome before removal can occur for the present connector 170. FIG. 4e is also understood to show a connector that has a latching component and a holding component with two springs 110, 112 located in a single housing groove 108. As shown in FIG. 4e, the first spring 110 is in a holding application by biasing against two flat surfaces and the second spring 112 is in a latching application by being held by the common groove, i.e., part of the housing groove 108 and part of the pin groove 130.

Figure 4F:
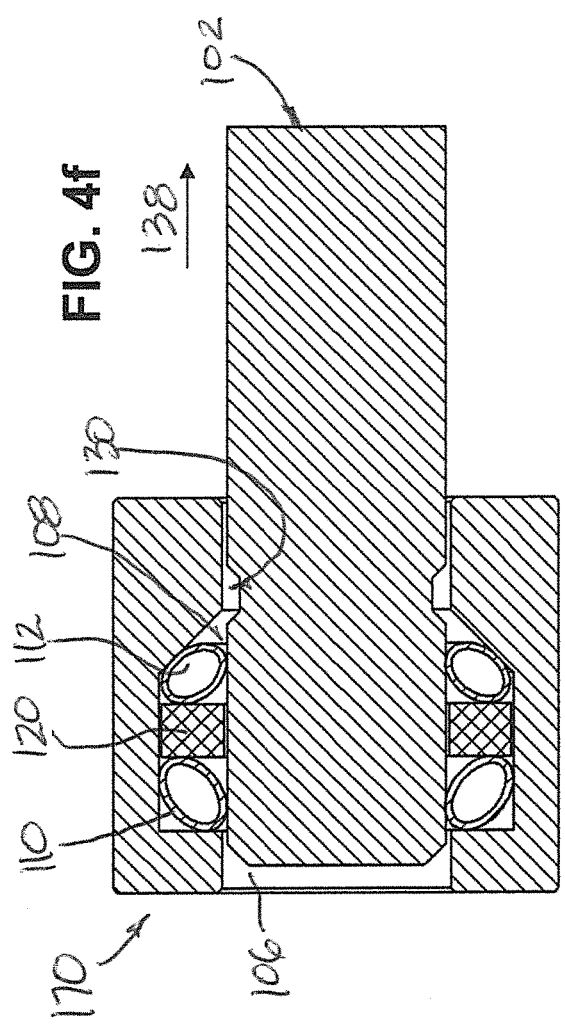

FIG. 4f shows the pin 102 in transit during the removal step by pulling the pin 102 in the second direction 138 and first overcoming the high disconnect force to counter rotate the two springs 110, 112. The connector 170 thus requires a higher disconnect force to remove the pin from the housing than the connect force to latch the pin to the housing, in the order of 1.3 times to about 30 times or more.

Thus, as aspect of the present disclosure is understood to include a connector comprising a housing 104 having a bore 106 and a housing groove 108 located therein having two canted coil springs that are positioned side-to-side in the housing groove, which includes a first spring 110 and a second spring 112, which are both canted coil springs, and wherein at least part of the first spring 110 projects out of the housing groove and into the bore. An axially movable divider 120, which is movable along the axial lengthwise axis of the housing, is located between the two springs. In one example, the divider 120 has a generally square cross-section. In other examples, the divider can have a generally rectangular cross-section. The divider 120 is not compressible. In other examples, the divider is compressible.

A pin 102 having a pin groove 130 is disposed inside the bore which pushes the first spring 110 to then move the divider 120 axially within the housing groove which then moves the second spring 112. Sufficient movement of the second spring 112 will allow the connector to capture the second spring in a common groove defined by the housing groove 108 and the pin groove 130. In one example, the pin groove has two tapered surfaces 176, 178 subtended by a flat bottom wall surface 180. In an example, the housing groove comprises a flat or vertical sidewall 114, which is generally normal to the housing lengthwise axis, a flat bottom wall 118, which is generally parallel to the housing lengthwise axis, and a tapered or slanted sidewall 116. The housing groove has a groove width that is sufficient to accommodate both springs 110, 112 and the divider on a side-by-side-by-side arrangement.

In the latched position (FIG. 4e), the second spring 112 as opposed to the first spring 110 is captured between the common groove defined by the housing groove 108 and the pin groove 130. Thus, another aspect of the present disclosure is understood to include a connector having two springs and wherein the first spring 110 contacts the pin 102 during insertion of the pin into the housing but wherein the second spring 112 is captured by the common groove in the latched position.

A still further feature of the present connector is a first spring 110 that is an axial canted coil spring being positioned vertically before the pin is latched to the housing but wherein the axial canted coil spring is rotated almost 90 degrees, about 65 degrees to about 87 degrees, when the pin is latched to the housing but wherein the first spring 110 is not captured by the common groove. In an example, a second spring 112 is incorporated and wherein the second spring 112 is positioned wholly within the housing groove 108 before the pin is inserted and not project into the annular space defined by housing bore 106, which space excludes the space defined by the housing groove 108. Wherein the second spring 112 is movable radially to project into the annular space defined by the housing bore 106 when the pin is latched with the housing to capture the second spring 112 between the common groove. In an example, the second spring 112 is moved by a divider which is moved by the first spring 110.

FIGS. 5a-5g show the connection/disconnection sequence for another alternative embodiment provided in accordance with further aspects of the present device, system, and method, which is generally designated 200. The connector 200 comprises a pin 102 comprising a pin groove 130, which can have similar groove geometries as the pin groove of FIGS. 4a-4f, and a housing 104 with a canted coil spring 112 located in the housing groove 108 that has a curved sidewall 202, a flat bottom wall 204, a straight sidewall 206 that is normal to the housing lengthwise axis, and a transition section 208 located between the bottom wall 204 and the curved sidewall 202. As shown, the canted coil spring 112 is a radial canted coil spring. Prior to contacting the pin 102, the spring 112 is spaced from the bottom wall 204 and/or the curved sidewall 202, such as having a gap or a void between the spring and the bottom wall 204 and/or the curved sidewall 202.

Figure 5B:
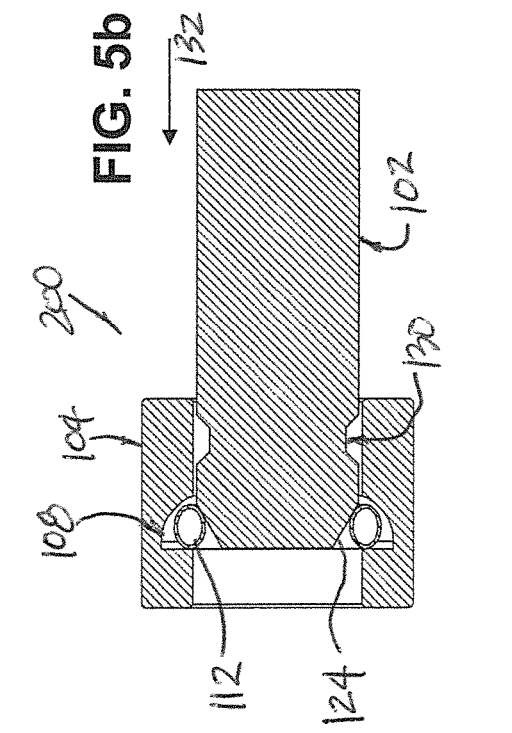
Figure 5A:
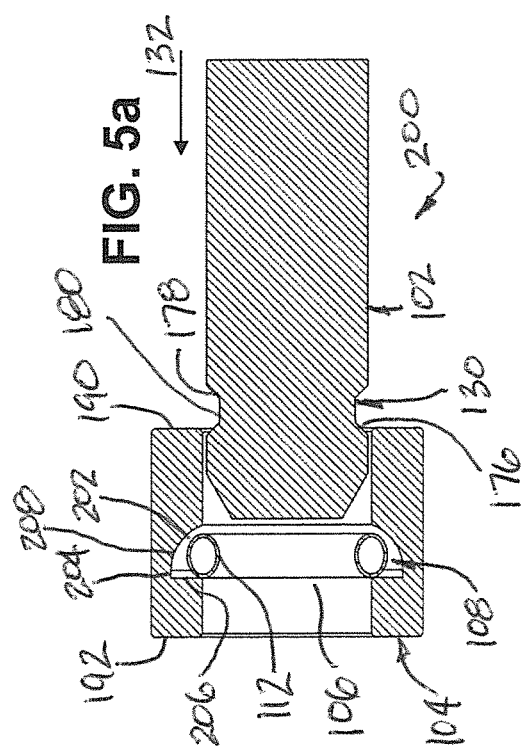

FIGS. 5a-5c show the pin 102 being inserted into the housing 104 by moving the pin 102 in the first direction 132. At FIG. 5c, the spring 112 is being deflected into the housing groove 108 and contacts the curved sidewall 202. At this point, the spring ring's inner perimeter expands due to the girth of the pin 102 and possibly deflects when simultaneously contacting both the landing area 134 on the pin and the curved sidewall. Preferably the spring is only slightly biased by the two surfaces and more preferably only touches the two surfaces. The spring's expansion by the pin defines, at least in part, the insertion force when latching the pin 102 to the housing 104.

FIG. 5d shows the spring 112 being captured between the common groove defined by the pin groove 130 and the housing groove 108. The pin 102 is now latched to the housing 104. FIG. 5e shows the pin 102 in the process of being unlatched or removed from the housing 104 by pulling the pin in the second direction 138. In the process, the spring 112 turns when squeezed by the tapered sidewall 176 of the pin groove 130 and the curved sidewall 202 of the housing groove 108. The curved surface 202 of the housing groove 108 hugs the spring 112 and may help to maintain the position and orientation of the spring during removal of the pin from the housing.

FIG. 5f shows further removal of the pin 102 from the housing 104 and the spring 112 further deflected. Like the embodiment of FIGS. 4a-4f and more fully described above, the removal of the pin 102 from the housing 104 may require a relatively large force for several reasons. Firstly, the tapered surface 176 of the pin groove 130 and the curved surface 202 of the housing groove 108 in contact with the spring 112 are close to or are generally parallel to one another, resulting in: generally opposing forces acting on the spring during removal of the pin from the housing, causing substantial deflection of the spring, and giving rise to minimal forces acting in the direction that the spring needs to rotate and move in order to allow removal of the pin from the housing. Secondly, the curved sidewall 202 of the housing groove 104 hugging the spring 112 and resisting the movement of the spring in the direction that the spring needs to move in order to allow removal of the pin 102. However, since the tapered sidewall 176 contacts the lower left side 196 of the spring 112 only as opposed to the entire left side, further retraction of the pin 102 in the second direction 138 with sufficient disconnect force will force the spring to rotate and back into the housing groove to enable separation of the pin from the housing.

As shown in FIG. 5g, the spring 112 has moved back into the housing groove 108 and the pin 102 is free to retract away from the housing 104.

FIG. 6 is another connector 200 provided in accordance to an alternative embodiment of the connector of FIGS. 5a-5g. The two connectors are the same with the exception of the housing groove 108. In the present embodiment, the curved sidewall is replaced by a multiple defined straight wall sections, resembling a polygonal geometry. For example, the groove 108 can have a straight sidewall 208 and multiple flat wall sections at 212, 214, and 216. Fewer and greater flat wall sections are contemplated. When more flat wall sections are incorporated, the polygonal geometry closely resembles the curved sidewall 202 of FIGS. 5a-5g. When fewer flat wall sections are incorporated, the spring 112 will experience distinct contact junctures created by the distinct flat wall sections during the withdraw process.

FIG. 7 shows yet another connector 100 provided in accordance with a further aspect of the present disclosure. The connector 100 of FIG. 7 is similar to the connectors of FIGS. 1a-g, FIG. 2, and FIGS. 3a-3g with two exceptions. First, a divider is omitted in the present connector 100. Second, instead of an outer spring, the present connector uses an elastic biasing member 220. In one example, the elastic member 220 is an O-ring. In another example, the elastic member can be a spring encapsulated by an elastic layer. The elastic member 220 can have different elasticity adjusted by using different materials and different durometers. Thus, the deflection force for the inner spring 110 and the elasticity of the elastic member 220 can be selected so that both deflect the same amount during insertion and removal of the pin from the housing, both deflect a different amount, the elastic member 220 can deflect more than the inner spring 110, or the elastic member can deflect less than the inner spring.

The alternative connector 240 of FIGS. 8a-8c is similar to the connector 100 of FIGS. 3a-3g with a few exceptions. The present connector 240 is also similar to the connector 100 of FIGS. 1a-1f if the divider 120 shown with the slanted inner surface 160 (FIGS. 8a-8c) is replaced for a divider 120 with a flat profile. In still another example, the present connector 240 is also similar to the connector 100 of FIG. 2 if the divider 120 is omitted. Finally, the present connector 240 is also similar to the connector 100 of FIG. 7 if the divider 120 is omitted and the outer spring 112 is replaced with an elastic member 220. These various combinations may be used with the pin 102 of the present embodiment.

As shown, the present connector 240 comprises a housing 104 having a bore with a housing groove 108 comprising two springs 110, 112 and a divider 120 comprising a slanted surface 160, as discussed above with reference to FIGS. 1a-3g. A pin 102 comprising a tapered insertion end 124 is disposed in the bore and the inner spring 112 latched between the common groove defined by the housing groove 108 and the pin groove 130. At this point, the pin 102 of FIG. 8 is latched to the housing 104, again similar to the sequence described above with reference specifically to FIGS. 3a-3d.

Also shown in FIG. 8a has a second pin groove 242. In one example, the second pin groove 242 comprises two tapered sidewalls 244, 246 subtended by a flat bottom wall 248. In other examples, the two sidewalls 244, 246 can be generally parallel to one another. The second pin groove 242 is larger than the first pin groove 130, which is understood to be wider or deeper or both wider and deeper than the first pin groove. The larger groove provides room to allow the inner spring 110 to relax to its more vertical position to then allow the pin 102 to retract away from the housing, as further discussed below.

FIG. 8b shows the pin 102 being pushed further into the housing 104 by moving the pin the first direction 132 until the inner spring 114 is captured by the second common groove defined by the housing groove 108 and the second pin groove 242. Before reaching this point, the sidewall 250 of the first pin groove 130 must contact and lift the inner spring 110 to move the spring to the second landing area 152 on the pin 102 and then into the second common groove shown in FIG. 8b. The further insertion force to the second pin groove 242 is relatively lower than the removal or disconnect force for the connector of FIGS. 3a-3g as the spring is already rotated in the same direction that facilitates further canting.

When the pin reaches the position shown in FIG. 8b, the second common groove, being much larger than the first common groove as the second pin groove 242 is larger than the first pin groove 130, allows both springs 110, 112 to relax to their less deflected state. As shown, the depth of the second pin groove 242 is sized so that the inner spring 110 does not contact the groove bottom 248 or either sidewall 244, 246. In other examples, the second pin groove 242 can be smaller so that the inner spring 110 contacts the second pin groove but still permits the inner spring 110 to somewhat relaxed, i.e., not rotated as much as shown in FIG. 8a.

The pin 102 may be removed from the position shown in FIG. 8b to the position shown in FIG. 8c by moving the pin 102 in the second direction 138. As the inner spring 110 is already rotated and relaxed at the second common groove of FIG. 8b and because of the larger space, the disconnect force to counter rotate the inner spring 110 by the first tapered sidewall 244 shown in FIG. 8c before the spring moves to the second landing area 252 is much less than the disconnect for to move the pin in the sequence of FIGS. 3e-3g. The size of the second pin groove 242 can therefore be selected to control the disconnect force to remove the pin from the housing.

Thus, as described, an aspect of the present connector 240 is understood to include a housing 104 having a bore 106 and a housing groove 108 located therein having two canted coil springs that are stacked inside the housing groove, which includes a first spring 110 and a second spring 112, which are both canted coil springs, and wherein at least part of the first spring projects out of the housing groove and into the bore. A pin 102 having a first pin groove 130 is disposed inside the bore and captures at least part of the first spring 110 that projects into the bore in the pin groove. The pin 102 further comprises a second pin groove 242 spaced from the first pin groove and larger than the first pin groove 130. In the present context, larger is understood to mean a groove that is wider or deeper or both. Wherein the first spring 110 is deflectable but the second spring 112 is not deflectable when the pin is inserted in a first direction 132 to latch the pin to the housing. Wherein the first spring 110 is not deflectable but the second spring 112 is deflectable when the pin is removed in a second direction 138, which is opposite the first direction, to remove the pin from the housing. In another example, both the first spring 110 and the second spring 112 deflect when the pin is moved in the first direction to latch the pin to the housing and again in the second direction to remove the pin from the housing.

The present disclosure is also understood to include a method for controlling connect and disconnect forces in a connector comprising a housing and a pin by stacking two canted coil springs into a housing groove and selecting which of the two springs to deflect when the pin is inserted, or moved in a first direction, into the housing and which to deflect when the pin is moved in the opposite direction, or moved in the second or withdraw direction, to separate from the housing. In a specific example, the spring that deflects when the pin is inserted may have a lower deflection force than the spring that deflects when the pin is withdrawn from the housing.

In an example, a divider 120 comprising a slanted surface 160 is located between the first or inner spring 110 and the second or outer spring 112. The slanted surface 160 is positioned to contact the inner spring 110 to increase the force required to disconnect the pin compared to when a divider is flat.

An aspect of the present disclosure and method is further understood to include a housing groove 108 sized and shaped to accommodate two stacked canted coil springs having a variable device to vary the space or room within the housing groove 108 for the inner spring of the two stacked springs to rotate. In one example, the variable device is a divider 120 that is movable or deflectable to provide the added space for the inner spring. In a particular example, the divider 120 is positioned adjacent an outer spring 112 and the outer spring is deflectable to allow room for the moving divider 120, which then provides room for the inner spring 110. The newly created space, gap, or room provided by the variable device gives the inner spring 110 the needed space to rotate so that the pin 102 can retract during disconnection. Said differently, if the divider 120 is not deflectable or variable, then the divider acts like a bottom wall of a typical housing groove, which will not yield and therefore will not permit the axial spring to rotate. This in turn would lead to a locking connector, which does not permit separation of the pin from the housing unless the spring is plastically deformed. In the present embodiment, the second pin groove 242 provides yet additional space for the inner spring 110 to rotate in addition to providing the variable device.

The present disclosure is further understood to include a method for controlling connect and disconnect forces in a connector comprising a housing and a pin by stacking two canted coil springs into a housing groove and selecting which of the two springs to deflect when the pin is inserted, or moved in a first direction, into the housing and which to deflect when the pin is moved in the opposite direction, or moved in the second or withdraw direction, to separate from the housing. In a specific example, the spring that deflects when the pin is inserted may have a lower deflection force than the spring that deflects when the pin is withdrawn or removed from the housing. A still further aspect of the present embodiment is a divider 120 located between the two springs 110, 112 to act as a ramp to facilitate the inner spring rotation during insertion of the pin into the housing. The slanted divider allows more room on one side of the groove 108 for the inner spring 110 to deflect into, such as to rotate into the extra room provided by the space provided by incorporating the slanted divider, which reduces the required insertion force. The second pin groove 242 provide yet additional room for the inner spring 110 to rotate.

Although limited embodiments of connector assemblies and their components have been specifically described and illustrated herein, many modifications and variations will be apparent to those skilled in the art. For example, the various pin grooves may change, the springs may be multi-metallic springs, and there may be more than one housing groove in use with more than one pin groove, etc. Furthermore, it is understood and contemplated that features specifically discussed for one connector embodiment may be adopted for inclusion with another connector embodiment, provided the functions are compatible. For example, the pin groove with two tapered sidewalls of FIG. 4a may be used for the generally square pin groove of FIG. 1a. Accordingly, it is to be understood that the connector assemblies and their components constructed according to principles of the disclosed device, system, and method may be embodied other than as specifically described herein. The disclosure is also defined in the following claims.

What is claimed is:

1. A latching connector comprising:
a housing comprising a bore, a pin comprising a tapered insertion end, a first spring comprising a plurality of first coils and a first coil axis passing through the plurality of first coils, and a second spring comprising a plurality of second coils and a second coil axis passing through the plurality of second coils, wherein at least one of the first spring and the second spring is a canted coil spring;
a first groove comprising two sidewalls and a bottom wall located between the two sidewalls formed in the bore of the housing having the first spring and the second spring positioned in the first groove, said first spring and said second spring being positioned beside each other so that the first coil axis is located outside of the second spring, the second coil axis is located outside of the first spring, and a portion of the first spring protrudes out of said first groove;
a second groove formed on an exterior of the pin;
a connected state in which the pin is latched to the housing, both the first spring and the second spring are biased, and at least one of the first spring and the second spring are deflected to a first deflected position; and
wherein the first spring or the second spring has a second deflected position, which is further deflected from the first deflected position, when the pin is disconnected from the housing.

2. The connector according to claim 1, wherein the first spring or the second spring is an axial canted coil spring.

3. The connector according to claim 1, wherein the first spring or the second spring is a radial canted coil spring.

4. The connector according to claim 1, wherein the first spring that protrudes out the first groove deflects at a lower deflection force than a deflection force to deflect the second spring.

5. The connector according to claim 1, further comprising a dividing member located between the first spring and the second spring.

6. The connector according to claim 5, wherein the dividing member comprises a slanted surface and is disposed between the first spring and the second spring.

7. The connector according to claim 5, wherein the dividing member is movable radially or axially within the first groove and is disposed between the first spring and the second spring.

8. The connector according to claim 5, wherein the first spring, the second spring, and the dividing member are positioned side-by-side-by-side within the first groove.

9. The connector according to claim 5, wherein a contact point between the dividing member and the first spring or the second spring is along an arc of the first coil of the first spring or the second coil of the second spring, and the contact point is less than 20 degrees from a major axis of the first coil of the first spring or a major axis of the second coil of the second spring.

10. The connector according to claim 1, wherein the first spring is canted one way and the second spring is canted another way, which differs from the one way.

11. The connector according to claim 1, wherein both the first spring and the second spring are deflected during connection of the pin to the housing but prior to either the first spring or the second spring protruding into the second groove.

12. The connector according to claim 1, wherein the first spring or the second spring is turned during connection of the pin to the housing and unturned during disconnection of the pin from the housing.

13. The connector of claim 1, wherein the pin comprises a second pin groove, which is spaced from the second groove and is larger than the second groove.

14. The connector of claim 1, wherein the second spring surrounds the first spring, or the first spring and the second spring are positioned side-by-side within the first groove.

15. The connector of claim 1, wherein the first spring and the second spring each contact the first groove.

16. A connector comprising:
a housing comprising a bore and a housing groove comprising two sidewalls and a bottom wall located between the two sidewalls;

a pin comprising a pin groove and a tapered insertion end;
a first coil spring and a second coil spring retained in the housing groove with a portion of the first coil spring protruding out said housing groove;
wherein the pin is positioned in the housing bore and latched to the housing with the first coil spring captured by a common groove defined by the housing groove and the pin groove and the first coil spring and the second coil spring each directly contacting the housing groove; and
wherein deflection of the first coil spring or the second coil spring is required for unlatching and separating the pin from the housing.

17. The connector according to claim 16, wherein the first coil spring or the second coil spring is a canted coil spring comprising a plurality of interconnected canted coils.

18. The connector according to claim 17, wherein the first coil spring or the second coil spring is a radial canted coil spring.

19. The connector according to claim 17, wherein the first coil spring has a ring inside diameter that is smaller than a ring inside diameter of the second coil spring.

20. The connector according to claim 17, further comprising a dividing member located between the first coil spring and the second coil spring.

21. The connector according to claim 20, wherein the dividing member comprises a slanted surface.

22. The connector according to claim 20, wherein the dividing member is movable radially or axially within the housing groove.

23. The connector according to claim 20, wherein the first spring, the second spring, and the dividing member are positioned side-by-side-by-side within the housing groove.

24. The connector according to claim 20, wherein a contact point between the dividing member and the first spring or the second spring is along an arc of a canted coil of the first spring or the second spring that is less than 20 degrees from a major axis of the canted coil.

25. The connector according to claim 20, wherein the first coil spring deflects at a lower deflection force than a deflection force to deflect the second coil spring.

26. The connector according to claim 17, wherein the first coil spring or the second coil spring is an axial canted coil spring.

27. The connector according to claim 16, wherein the first spring is canted one way and the second spring is canted another way, different from the one way.

28. The connector according to claim 16, wherein the first coil spring or the second coil spring is turned during connection of the pin to the housing and unturned during disconnection of the pin from the housing.

29. The connector according to claim 16, wherein the first coil spring comprises a plurality of first coils and a first coil axis passing through the plurality of coils and the second coil spring comprises a plurality of second coils and a second coil axis passing through the plurality of coils, and wherein the first coil axis is located outside of the second coil spring and the second coil axis is located outside of the first coil spring.

* * * * *

UNITED STATES PATENT AND TRADEMARK OFFICE
CERTIFICATE OF CORRECTION

PATENT NO. : 9,829,028 B2
APPLICATION NO. : 14/080688
DATED : November 28, 2017
INVENTOR(S) : Derek Changsrivong et al.

It is certified that error appears in the above-identified patent and that said Letters Patent is hereby corrected as shown below:

In the Specification

In Column 2, Lines 58-59, delete "side-by-side-by-side" and insert -- side-by-side --, therefor.

In Column 3, Line 49, delete "FIG." and insert -- FIGS. --, therefor.

In Column 3, Line 53, delete "FIG." and insert -- FIGS. --, therefor.

In Column 15, Lines 22-23, delete "side-by-side-by-side" and insert -- side-by-side --, therefor.

In the Claims

In Column 20, Line 36, in Claim 8, delete "side-by-side-by-side" and insert -- side-by-side --, therefor.

In Column 22, Line 3, in Claim 23, delete "side-by-side-by-side" and insert -- side-by-side --, therefor.

Signed and Sealed this
Twenty-third Day of August, 2022

Katherine Kelly Vidal
*Director of the United States Patent and Trademark Office*